(12) United States Patent
Mazzella et al.

(10) Patent No.: US 10,203,212 B2
(45) Date of Patent: Feb. 12, 2019

(54) METHOD AND SYSTEM FOR DETERMINING DETOURED TRIPS

(71) Applicant: COMUTO S.A., Paris (FR)

(72) Inventors: Frederic Gabriel Mazzella, Paris (FR); Francis Gerard Nappez, Paris (FR); Mathieu Mehdi Louafi, Paris (FR); Nicolas Georges Erwin Schwartz, Paris (FR)

(73) Assignee: COMUTO S.A., Paris (FR)

(*) Notice: Subject to any disclaimer, the term of this patent is extended or adjusted under 35 U.S.C. 154(b) by 42 days.

(21) Appl. No.: 15/381,143

(22) Filed: Dec. 16, 2016

(65) Prior Publication Data
US 2018/0172459 A1  Jun. 21, 2018

(51) Int. Cl.
G01C 21/34 (2006.01)
G01C 21/36 (2006.01)
G01C 21/20 (2006.01)
G06Q 10/04 (2012.01)

(52) U.S. Cl.
CPC ......... *G01C 21/3415* (2013.01); *G01C 21/20* (2013.01); *G01C 21/3617* (2013.01); *G01C 21/3626* (2013.01); *G06Q 10/04* (2013.01)

(58) Field of Classification Search
CPC ............... G01C 21/20; G01C 21/3415; G01C 21/3617; G01C 21/3626; G06Q 10/04
USPC ........................................ 701/411
See application file for complete search history.

(56) References Cited

U.S. PATENT DOCUMENTS

| | | |
|---|---|---|
| 6,356,838 B1 | 3/2002 | Paul |
| 6,751,548 B2 | 6/2004 | Fox et al. |
| 7,080,019 B1 | 7/2006 | Hurzeler |
| 7,391,341 B2 | 6/2008 | Keaveny et al. |
| 8,140,256 B1 | 3/2012 | Dos-Santos et al. |
| 8,285,571 B2 | 10/2012 | Demirdjian et al. |
| 8,688,378 B2 | 4/2014 | McCall et al. |
| 8,688,532 B2 | 4/2014 | Khunger et al. |

(Continued)

FOREIGN PATENT DOCUMENTS

| | | |
|---|---|---|
| WO | 2014203256 A1 | 12/2014 |
| WO | 2016019189 A1 | 2/2016 |

OTHER PUBLICATIONS

Furuhata, Masabumi et al., "Ridesharing: The state-of-the-art and future directions", Transportation Research Part B: Methodological, vol. 57, Nov. 2013, pp. 28-46.

*Primary Examiner* — Atul Trivedi
(74) *Attorney, Agent, or Firm* — BCF LLP

(57) ABSTRACT

A system for and a method of determining that a detoured trip is to be presented to a potential passenger. The method comprises receiving a rideshare request; generating a rideshare request parameter; and accessing, from a database, trip filtering parameters associated with trips. The method further comprises determining that at least one of the trips is a candidate for which a detour route is to be computed based on an analysis of the rideshare request parameter and a corresponding trip filtering parameter associated with the at least one of the trips; causing to compute, for the at least one of the trips determined as being the candidate for which the detour route is to be computed, a detoured trip; and determining that the detoured trip is to be presented to the potential passenger by analyzing the deviation value of the detoured trip and the deviation threshold.

30 Claims, 17 Drawing Sheets

(56) References Cited

U.S. PATENT DOCUMENTS

| | | | |
|---|---|---|---|
| 8,706,409 B2 * | 4/2014 | Mason | G01C 21/3469 |
| | | | 701/424 |
| 8,909,475 B2 | 12/2014 | Gishen et al. | |
| 9,267,807 B2 | 2/2016 | Choudhury | |
| 9,483,744 B2 * | 11/2016 | Lord | G06Q 50/30 |
| 9,562,785 B1 * | 2/2017 | Racah | G01C 21/3438 |
| 9,702,719 B2 * | 7/2017 | Mason | G01C 21/3469 |
| 9,816,824 B1 * | 11/2017 | Racah | G01C 21/3438 |
| 9,857,190 B2 * | 1/2018 | Marueli | G01C 21/3484 |
| 9,886,671 B2 * | 2/2018 | Lord | G06Q 50/30 |
| 9,898,759 B2 * | 2/2018 | Khoury | G08G 1/0129 |
| 9,904,900 B2 * | 2/2018 | Cao | G06Q 50/30 |
| 2007/0276595 A1 | 11/2007 | Lewinson et al. | |
| 2008/0091342 A1 | 4/2008 | Assael | |
| 2008/0270204 A1 | 10/2008 | Poykko et al. | |
| 2009/0083111 A1 | 3/2009 | Carr | |
| 2009/0248587 A1 | 10/2009 | Van Buskirk | |
| 2012/0078672 A1 | 3/2012 | Mohebbi et al. | |
| 2013/0268195 A1 | 10/2013 | Tai et al. | |
| 2014/0082069 A1 | 3/2014 | Varoglu et al. | |
| 2014/0173511 A1 | 6/2014 | Lehmann et al. | |
| 2014/0207375 A1 | 7/2014 | Lerenc | |
| 2014/0350975 A1 | 11/2014 | Paperno | |
| 2015/0006072 A1 | 1/2015 | Goldberg et al. | |
| 2015/0095198 A1 | 4/2015 | Eramian | |
| 2015/0142484 A1 | 5/2015 | Huang et al. | |
| 2015/0254581 A1 | 9/2015 | Brahme | |
| 2015/0285651 A1 * | 10/2015 | Cerecke | G01C 21/3446 |
| | | | 701/533 |
| 2015/0324718 A1 | 11/2015 | Lord et al. | |
| 2016/0027306 A1 | 1/2016 | Lambert et al. | |
| 2016/0364678 A1 * | 12/2016 | Cao | G06Q 50/30 |
| 2016/0364679 A1 * | 12/2016 | Cao | G06Q 10/083 |
| 2016/0364812 A1 * | 12/2016 | Cao | G06Q 50/01 |
| 2016/0364823 A1 * | 12/2016 | Cao | G06Q 50/30 |
| 2017/0307391 A1 * | 10/2017 | Mason | G01C 21/3469 |

* cited by examiner

METHOD AND SYSTEM FOR DETERMINING DETOURED TRIPS

FIELD

The present technology relates to systems and methods for determining detoured trips. In particular, the systems and methods aim at processing a rideshare request and causing to compute a detour trip.

BACKGROUND

Over the past years, ridesharing (also referred to as carpooling, car sharing and lift sharing) has become increasingly popular, largely thanks to online ridesharing platforms such as Blablacar™. Ridesharing platforms such as Blablacar™ have facilitated matching drivers offering available seats in a vehicle with passengers looking for drivers offering such available seats. The general concept is that the ridesharing platforms allow connecting drivers to passengers willing to travel together between cities and share the cost of the journey. Benefits of such approach are readily known, amongst which, without being limited to, reducing travelling costs, reducing traffic on the roads thereby lowering greenhouse gases and pollutant levels and/or creating a social experience by facilitating connections between individuals who would have otherwise not met.

Typically, an online ridesharing platform may be accessed by electronic devices via a web browser and/or an application (also referred to as an "app"). In some instances, the drivers and/or the passengers may register and create a personal online profile. The personal online profile may include ratings and reviews by other members, social network verification, etc. The personal online profile may show how much experience the user has with the service and, in some instances, a "Blabla" measurement indicating how much a user is willing to chat during a trip.

Once the drivers and/or the passengers have registered with the service, they may either publish a trip (for cases where the user is a driver offering seats) or search for a trip (for cases where the user is a passenger looking for seats). For instances where the user is a driver, the platform may require certain information to be provided. Such information may include, but is not limited to, driver departure position, driver arrival position, waypoints (also referred to as stopovers between the driver departure position and the driver arrival position), departure time and date, number of available seats, kilometric rate paid by passenger, etc. Once the information is provided, the platform may generate a route, which, in some instances, may be a realistic route. The realistic route may comprise a trajectory, duration and/or a realistic distance. The information provided by the driver and/or the route generated by the platform may be published in a searchable database and referred to as a trip or trip data.

Once a trip is published, it may then be accessed by a passenger. In some instances, the passenger may provide information to a trip search engine. The information may take the form of a rideshare request and may comprise information such as a passenger departure position, a passenger arrival position, a departure time and date, number of required seats, etc. The trip search engine may then determine which trips amongst the trips published in the trip database match at least some criteria of the rideshare request. The trip search engine may then present a list of trips meeting at least some criteria of the rideshare request to the passenger. The passenger may then select the trips that she/he deems the most appropriate and connect with the driver associated with the selected trips to complete a transaction.

Even though ridesharing platforms enabling a trip search engine has greatly improved the ridesharing experience for both the drivers and the passengers by allowing great volumes of trips to be published by drivers and searched by passengers, improvements may still be desirable.

SUMMARY

Embodiments of the present technology have been developed based on developers' appreciation of at least one shortcoming associated with the prior art.

In particular, at least one shortcoming associated with current ridesharing platforms may arise when a passenger departure position and/or a passenger arrival position does not match any of the driver departure position and/or driver arrival position associated with the trips published in the trip database. As a result, in some instances, the current ridesharing platforms may end up returning no results to a passenger even though, in real life, at least one driver associated with one or more trips published in the trip database would have been willing to undertake a detour from her/his original route to accommodate the rideshare request.

In addition, a high number of trips stored in the trip database may limit an ability of the trip search engine to compute a high number of detours in order to identify which trips, amongst the trips stored in the trip database, may be more likely to be acceptable for one or more drivers. This shortcoming may be further emphasised by a necessity to provide results to the passenger within an acceptable period of time (typically a few seconds).

The present technology arises from an observation made by the inventor(s) that, upon receiving instructions from a driver to create a trip in a ridesharing platform, trip data and trip filtering parameters may be generated. The trip filtering parameters may be generated based on a driver departure position, a driver arrival position and/or an original route (which may comprise a trajectory, duration and/or driver realistic distance). The trip filtering parameters may then be relied upon to determine whether the trip data is a candidate for which a detour route is to be computed upon receiving a rideshare request. In some instances, the trip filtering parameters may allow determining whether the trip data is a candidate for which a detour route is to be computed upon receiving a rideshare request without requiring the detour route to actually be computed to make the determination.

In some instance, upon receiving a rideshare request from a passenger, the rideshare platform may determine that at least one trip, amongst the trips stored in a database, may be a candidate for which a detour route is to be computed. In some instances, the determination may be based on the analysis of the rideshare request and the trip filtering parameters associated with the at least one trip.

The present technology therefore allows determining whether a trip is a candidate for which a detour route is to be computed without requiring the detour route to actually be computed. As a result, the ridesharing platform may not need, upon receiving a ridesharing request, to compute detour routes associated with each trip of the trip database thereby reducing the processing power required for the trip search engine and/or improving a response time for providing results to a passenger.

Other benefits may also become apparent to the person skilled in the art of the present technology further to the reading of the description of the technology set forth below.

In one aspect, various implementations of the present technology provide computer-implemented method for execution by a system, the method comprising:

receiving, from an electronic device associated with a potential passenger, a rideshare request, the rideshare request being associated with a search departure position and a search arrival position;

generating, by a processor, a rideshare request parameter based on at least one of the the search departure position and the search arrival position;

accessing, from a database, trip filtering parameters associated with trips, each one of the trips being associated with a driver departure position, a driver arrival position, an original route from the driver departure position to the driver arrival position and a deviation threshold reflective of an acceptable deviation from the original route, each one of the trip filtering parameters having been generated based on at least one of the driver departure position, the driver arrival position, the original route and the deviation threshold;

determining, by the processor, that at least one of the trips is a candidate for which a detour route is to be computed based on an analysis of the rideshare request parameter and a corresponding trip filtering parameter associated with the at least one of the trips;

causing to compute, for the at least one of the trips determined as being the candidate for which the detour route is to be computed, a detoured trip, the detoured trip being associated with a detour route and a deviation value associated with the detour route and reflective of a deviation between the original route and the detour route;

determining, by the processor, that the detoured trip is to be presented to the potential passenger by analysing the deviation value of the detoured trip and the deviation threshold; and transmitting, to the electronic device, data associated with the detoured trip for displaying to the potential passenger.

In some other embodiments, various implementations of the present technology provide computer-implemented method for execution by a system, the method comprising:

receiving, from an electronic device associated with a potential passenger, a rideshare request, the rideshare request being associated with a search departure position and a search arrival position;

accessing, from a database, trip filtering parameters associated with trips, each one of the trips being associated with a driver departure position, and a driver arrival position, each one of the trip filtering parameters having been generated based on at least one of the driver departure position and the driver arrival position;

determining, by the processor, for at least one the trips, that the at least one trip is a candidate for which a detour route is to be computed based on an analysis of the searched departure position and the searched arrival position and the trip filtering parameters;

causing to compute, for the at least one trip determined as being a candidate for which a detour route is to be computed, a detoured trip; and storing, in a non-transitory computer readable medium, the detoured trip.

In some other embodiments, various implementations of the present technology provide computer-implemented method for execution by a system, the method comprising:

receiving, from an electronic device, a rideshare request associated with a potential passenger, the rideshare request being associated with a search departure position and a search arrival position;

accessing, from a database, parameters associated with trips, the parameters being associated with a driver departure position, a driver arrival position and a deviation threshold reflective of an acceptable deviation from an original route between the driver departure position and the driver arrival position;

identifying, by a processor, a set of trip candidates for which a detour route is to be computed based on an analysis of the rideshare request and the parameters associated with the trips;

causing to compute, for at least one trip candidate of the set of trip candidates, a detoured trip associated with a detour route and a deviation value associated with the detour route and reflective of a deviation between the original route and the detour route;

generating, by the processor, a list of detoured trips based on a determination that, for the at least one of the candidate, the computed deviation value does not exceed the deviation threshold associated with a corresponding trip; and storing, in a non-transitory computer readable medium, the list of detoured trips.

In some other embodiments, various implementations of the present technology provide computer-implemented method for execution by a system, the method comprising:

receiving, from an electronic device associated with a driver, instructions to create a trip in a ridesharing platform, the instructions being associated with a driver departure position, a driver arrival position and a deviation threshold reflective of an acceptable deviation from an original route from the driver departure position to the driver arrival position;

generating, by a processor, trip data, the trip data being associated with the driver departure position and the driver arrival position;

generating, by the processor, trip filtering parameters allowing determining whether the trip data is a candidate for which a detour route is to be computed upon receiving a rideshare request, the rideshare request comprising a search departure position and a search arrival position, the trip filtering parameters being generated based on at least one of the driver departure position, the driver arrival position and the deviation threshold;

storing, in a first database, the trip data;

storing, in a second database, the trip filtering parameters; and transmitting, to the electronic device, a confirmation that the ridesharing platform has been updated so that the trip data may be taken into consideration for determining whether the trip data is a candidate for which a detour route is to be computed in response to the receipt of the rideshare request.

In other aspects, various implementations of the present technology provide a computer-based system, such as, for example, but without being limitative, an electronic device comprising at least one processor and a memory storing program instructions for processing a rideshare request, the program instructions being executable by one or more processors of the computer-based system to carry out one or more of the above-recited methods.

In other aspects, various implementations of the present technology provide a non-transitory computer-readable medium storing program instructions for processing a rideshare request, the program instructions being executable by a processor of a computer-based system to carry out one or more of the above-recited methods.

In yet other aspects, various implementations of the present technology provide a computer-based system, such as, for example, but without being limitative, an electronic device comprising at least one processor and a memory storing program instructions for processing instructions to create a trip in a ridesharing platform, the program instructions being executable by one or more processors of the computer-based system to carry out one or more of the above-recited methods.

In other aspects, various implementations of the present technology provide a non-transitory computer-readable medium storing program instructions for processing instructions to create a trip in a ridesharing platform, the program instructions being executable by a processor of a computer-based system to carry out one or more of the above-recited methods.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Yet as another example, it should be understood that, the use of the terms "first direction" and "third direction" is not intended to imply, unless specified otherwise, any particular order, type, chronology, hierarchy or ranking (for example) of/between the directions, nor is their use (by itself) intended imply that any "second direction" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
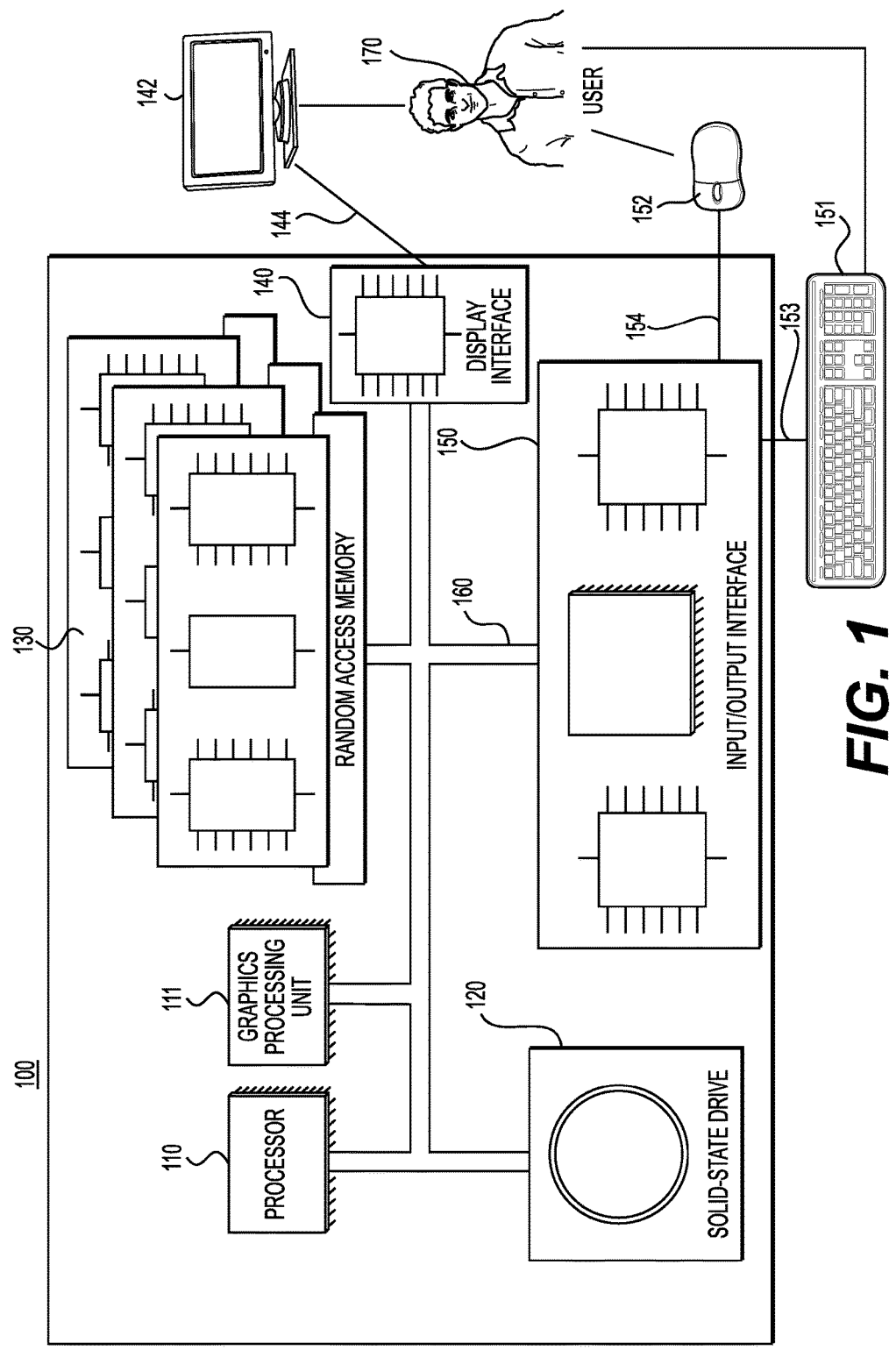
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a user 170, and the input/output interface 150 may be coupled to a touchscreen (not shown), a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 and/or the GPU 111 for processing a rideshare request and/or instructions to create a trip in a ridesharing platform. For example, the program instructions may be part of a library or an application.

Figure 2:
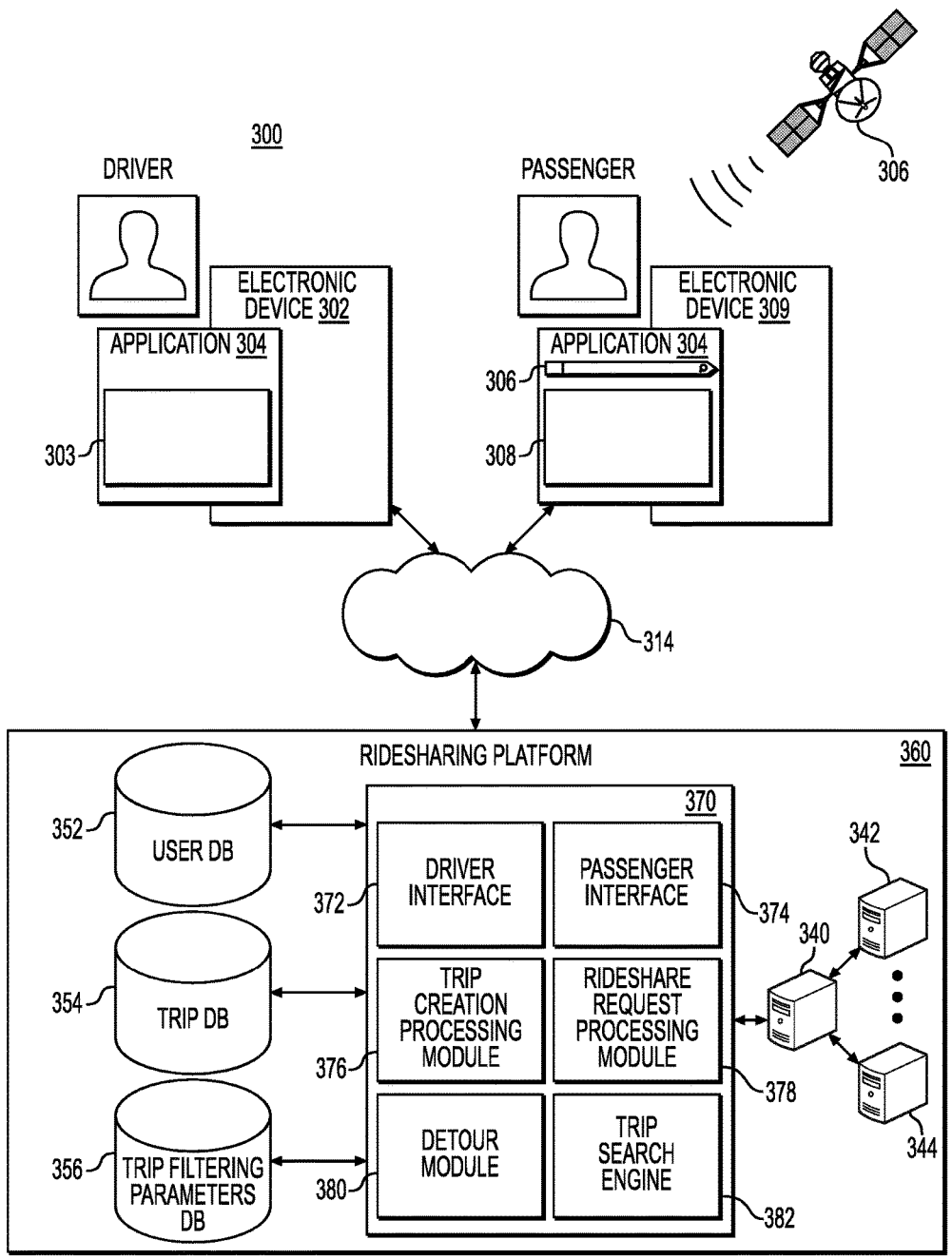
FIG. 2 is a diagram of a networked computing environment in accordance with an embodiment of the present technology.

In FIG. 2, there is shown a networked computing environment 300 suitable for use with some implementations of the present technology. The networked computing environment 300 comprises a first electronic device 302 and a second electronic device 309. Each of the first electronic device 302 and the second electronic device 309 may also be referred to as a "client device", an "electronic device" or an "electronic device associated with the user". Each of the first electronic device 302 and the second electronic device 309 may be associated with users, such as the user 170. For the purpose of illustrating the present technology, the first electronic device 302 is associated with a driver (i.e., a user offering seats) and the second electronic device 309 is associated with a passenger (i.e., a user looking for available seats). Even though reference is made to a driver, the term "driver" should be broadly construed as an individual offering seats via a ridesharing platform. Also, even though reference is made to a passenger, the term "passenger" should be broadly construed as an individual looking for seats via a ridesharing platform and may be interchangeably used with the term "potential passenger", amongst other terms. It should also be noted that the fact that the first electronic device 302 and the second electronic device 309 are respectively associated with the driver and the passenger, it does not need to suggest or imply any mode of operation—such as a need to log in, a need to be registered or the like.

The implementation of the first electronic device 302 and the second electronic 309 is not particularly limited, but as an example, the first electronic device 302 and the second electronic 309 may be implemented as a personal computer (desktops, laptops, netbooks, etc.), a wireless communication device (a cell phone, a smartphone, a tablet and the like) or a connected object (a connected watch, a connected car, an augmented reality device and the like). The first electronic device 302 and the second electronic 309 may each comprise hardware and/or software and/or firmware (or a combination thereof), as is known in the art, to execute an application 304. Generally speaking, the purpose of the application 304 is to enable a driver and/or a passenger to execute various functions relating to interactions between drivers and passengers, such as, but not limited to, (1) creating and publishing new trips, (2) searching and identifying trips relevant to a given passenger and (3) communicating and completing a transaction between a passenger and a driver. To that end, the application 304 comprises various graphical user interface (GUI) elements amongst which, a form 303 allowing creation of a new trip, a search query interface 306 and a search results interface 308.

How the application 304 is implemented is not particularly limited. One example of the application 304 may be embodied in the driver or the passenger accessing a web site associated with a ridesharing platform. For example, the application 304 can be accessed by typing in an URL associated with Blablacar™ ridesharing platform at www-.blablacar.fr. It should be expressly understood that the search application 304 can be accessed using any other commercially available or proprietary search engine.

In alternative non-limiting embodiments of the present technology, the application 304 may be implemented as a browser application on a portable device (such as a wireless communication device). For example (but not limited) to those implementations, where the first electronic device 302 or the second electronic device 309 is implemented as a portable device, such as for example, Samsung™ Galaxy™ S7 or Apple™ iPhone 6S™, the first electronic device 302 or the second electronic device 309 may be executing a Apple, Google, Microsoft or Yandex browser application. In some other embodiments, the application 304 may be implemented as an "app" available on an app store such as the App Store™ from Apple. It should be expressly understood that any other commercially available or proprietary browser application or any available or proprietary app can be used for implementing non-limiting embodiments of the present technology.

The first electronic device 302 and the second electronic device 309 are coupled to a communications network 314 via a communication link (not shown). In some non-limiting embodiments of the present technology, the communications network 314 can be implemented as the Internet. In other embodiments of the present technology, the communications network 314 can be implemented differently, such as any wide-area communications network, local-area communications network, a private communications network and the like.

How the communication link (not shown) is implemented is not particularly limited and will depend on how the first electronic device 302 or the second electronic device 309 is implemented. Merely as an example and not as a limitation, in those embodiments of the present technology where the first electronic device 302 or the second electronic device 309 is implemented as a wireless communication device (such as a smart-phone), the communication link (not shown) can be implemented as a wireless communication link (such as but not limited to, a 3G communications network link, a 4G communications network link, a Wireless Fidelity, or WiFi® for short, Bluetooth® and the like). In those examples, where the first electronic device 302 or the second electronic device 309 is implemented as a notebook computer, the communication link can be either wireless (such as the Wireless Fidelity, or WiFi® for short, Bluetooth® or the like) or wired (such as an Ethernet based connection). In some implementations, the first electronic device 302 or the second electronic device 309 may be in communication with a GPS satellite 306 transmitting a GPS signal to the first electronic device 302 or the second electronic device 309.

It should be expressly understood that implementations for the first electronic device 302 or the second electronic device 309, the communication link (not shown) and the communications network 314 are provided for illustration purposes only. As such, those skilled in the art will easily appreciate other specific implementational details for the first electronic device 302 or the second electronic device 309, the communication link (not shown) and the communications network 314. As such, by no means, examples provided herein above are meant to limit the scope of the present technology.

Also coupled to the communication network 314 is the ridesharing platform 360. In some embodiments, the ridesharing platform 360 may be enabled by one or more servers 340, 342 and 344. The servers 340, 342, 344 can be implemented as conventional computer servers. In an example of an embodiment of the present technology, the servers 340, 342, 344 can be implemented as Dell™ PowerEdge™ Servers running the Microsoft™ Windows Server™ operating system. Needless to say, the servers 340, 342, 344 can be implemented in any other suitable hardware and/or software and/or firmware or a combination thereof. In the depicted non-limiting embodiment of present technology, the servers 340, 342, 344 define a distributed architecture relying on multiple servers. In alternative non-limiting embodiments of the present technology, the functionality of the servers 340, 342, 344 may be on a single server.

One or more of the servers 340, 342, 344 operates a ridesharing platform 360. In the illustrated example of FIG. 2, the ridesharing platform 360 comprises a set of software modules 370, a user database 352, a trip database 354 and a trip filtering parameters database 356. The general purpose of the ridesharing platform 360 is to allow drivers and/or passenger (1) creating and publishing new trips, (2) searching and identifying trips relevant to a given passenger and (3) communicating and completing a transaction between a passenger and a driver. In an exemplary embodiment, the set of modules 370 comprises a driver interface 372, a passenger interface 374, a trip creation processing module 376, a rideshare request processing module 378, a detour module 380 and a trip search engine 382. As it will be understood by a person skilled in the art of the present technology, modules of the set of modules 370 are provided as an example and many variations may be therefore envision without departing from the scope of the present technology. This aspect should not be construed as being limitative of the scope of the present technology.

In the exemplified embodiment, the driver interface 372 may embody functions allowing the receipt and processing of information from a driver's device (e.g., the first electronic device 302). As an example, such information may comprise a driver position, a driver arrival position, a deviation threshold reflective of an acceptable deviation from an original route between the driver departure position and the driver arrival position. The acceptable deviation may be provided via multiple ways, such as, but not limited to, a detour duration acceptance, a maximal detour duration, a maximal detour distance, a minimal duration with a passenger and a minimal distance with a passenger. In some embodiments, the acceptable deviation may be provided as an absolute value (e.g., a number of kilometers, a duration in seconds, minutes or hours, etc) and/or as a relative value (e.g., a percentage). In some embodiments, the deviation threshold may be directly provided by the driver or may be computed based on information provided by the driver. In some embodiments, the information may also comprise a departure date and time, a number of available seats and a price by seat. In some embodiments, the information received via the driver interface 372 may be transmitted to a trip creation processing module 376 and/or stored in the user database 352 and/or in the trip filtering parameters database.

The trip creation processing module 376 may generate trip data based on the information received from the driver interface 372. In some embodiments, the trip data may be associated with the driver departure position and the driver arrival position. In some embodiments, the trip creation processing module 376 may also generate trip filtering parameters. The trip filtering parameters may be used by the rideshare request processing module 378 to determine whether the trip data is a candidate for which a detour route is to be computed upon receiving a rideshare request. In some embodiments the trip creation processing module 376 is said to "precompute" data, such as the rideshare request parameters. Reference to "precomputation" may be made, in some embodiments, to illustrate that the rideshare request parameters are generated before a rideshare request is processed by the rideshare request processing module 378, thereby accelerating processing of the rideshare request. More details regarding the trip data and the trip filtering parameters will be provided in the paragraphs below.

Turning now to the passenger interface 374, the passenger interface 374 may embody functions allowing the receipt and processing of information defining one or more rideshare request received from a passenger's device, such as the second electronic device 309. As an example, such information may comprise a search departure position, a search arrival position. In some embodiments, the information may also comprise a departure date and time. In some embodiments, the information received via the passenger interface 372 may be transmitted to the rideshare request processing module 378 and/or the trip database 354 and/or the trip filtering parameters database 356.

Even though illustrated as two distinct software modules, the driver interface 372 and the passenger interface 374 may, in some embodiments, also define a single interface. Also, in some embodiments, the driver interface 372 and/or the passenger interface 374 may also be configured to receive information relating to a user profile. The user profile may be a driver profile and/or a passenger profile. Information relating to the user profile may be processed by a user profile module (not shown) and stored in the user database 352. As a person skilled in the art of the present technology will appreciate, multiple variations as to how the driver interface 372 and the passenger interface 374 may be implemented may be envisioned without departing from the scope of the present technology.

The rideshare request processing module 378 may embody functions allowing to generate rideshare request parameters based on the rideshare request. For example, the rideshare request parameters may be based on a search departure position and/or a search arrival position. The rideshare request parameters, once generated, may be used by the trip search engine 382 so as to identify which trips, amongst the trips stored in the trip database 354 are candidate for which a detour route is calculated. In some embodiments, the identification may be based by comparing rideshare request parameters with trip filtering parameters stored in the trip filtering parameters database 356. In some embodiments, comparing rideshare request parameters with trip filtering parameters stored in the trip filtering parameters database 356 allows identifying trip candidates candidate for which a detoured trip is to be calculated without having to compute a detour route for each one of the trip candidates. In some embodiments, comparing rideshare request parameters with trip filtering parameters stored in the trip filtering parameters database 356 may be executed by the trip search engine 382. Amongst many other benefits, this allows pre-filtering trips so as to limit a number of detour trips to be calculated by the detour module 380 thereby reducing a processing power required to identify detoured trips based on a large volume of trips stored in the trip database 354 and/or improving a responsiveness of the ridesharing platform 360 to rideshare requests transmitted by passengers.

Once the trip candidates are identified by the trip search engine 382, the trip search engine 382 may rely on the detour module 380 to compute a detoured trip. The detoured trip may comprise a detour route and/or a deviation value associated with the detour route and reflective of a deviation between an original route and a detour route. Once a detoured trip is computed, the trip search engine 382 may then determine that one or more calculated detoured trips are to be presented to the passenger. This determination may be based on an analysis of a deviation value of the detoured trip and a deviation threshold associated with a trip. In some embodiments, the trip search engine 382 may prepare and transmit a list of search results comprising one or more detoured trips to the electronic device 309. In some embodiments, the rideshare request processing module 378, the detour module 380 and the trip search engine 382 may define a single software module or distinct software modules. In some embodiments, the rideshare request processing module 378 may be part of the trip search engine 382, so does the detour module 380. In some embodiments, the detour module 380 may be hosted on distinct servers and/or be a service independent from the ridesharing platform 360. As a person skilled in the art of the present technology may appreciate, how the rideshare request processing module 378, the detour module 380 and the trip search engine 382 are arranged and where they are hosted are not critical to the purpose of the present technology and multiple variant may be envisioned without departing from the scope of the present technology.

Figure 3:
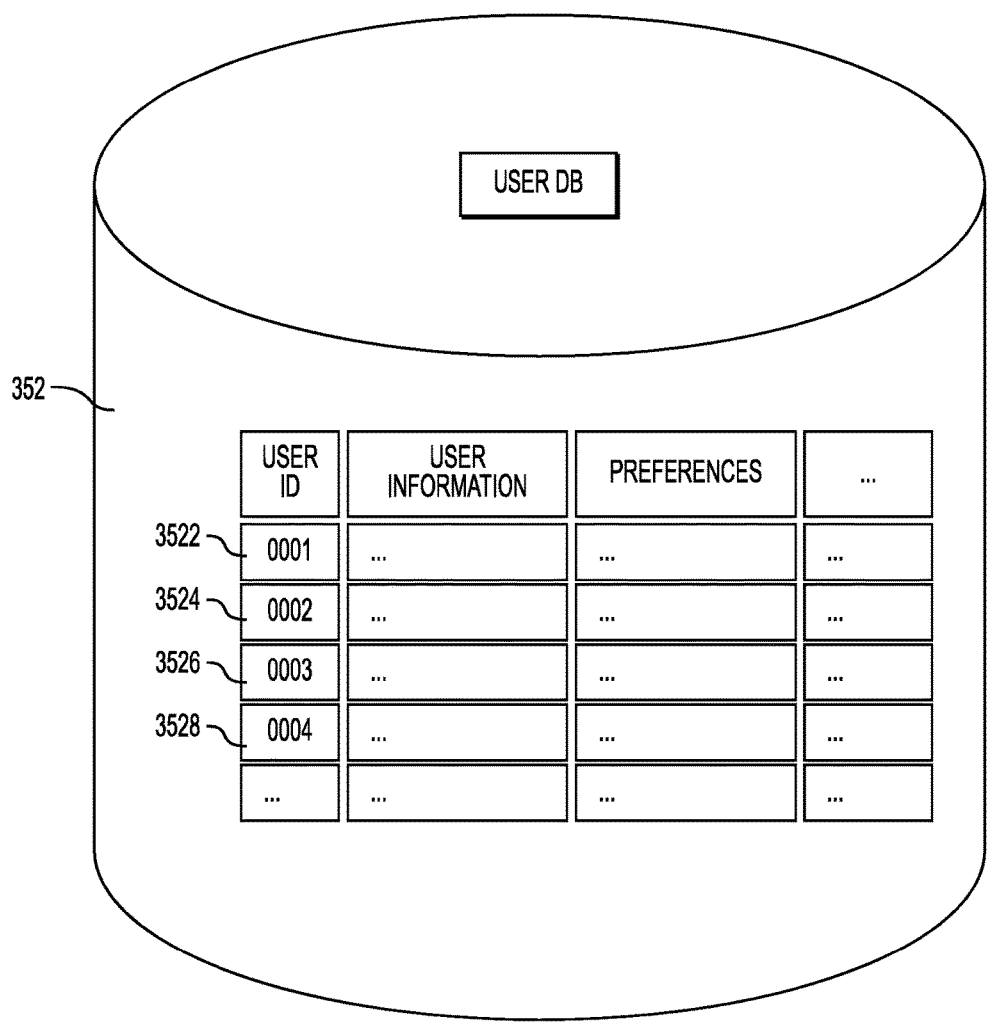
FIG. 3 is a diagram of a first database in accordance with an embodiment of the present technology.

Turning now to FIG. 3, an example of a data structure of the user database 352 is illustrated. In this example, the data structure comprises multiple rows, each one of the rows allows storing of data relating to a user. In the given example, the user database 352 comprises four users, each associated with a unique user ID, namely "0001" referred to as 3522, "0002" referred to as 3524, "0003" referred to as 3526 and "0004" referred to as 3528. Each one of the users may be a driver and/or a passenger. Each one of the rows may allow storing information such as user information, preferences, etc. In some embodiments, the user database 352 may comprise enough information so as to enable a social network allowing users to interact amongst themselves, share information and conduct financial transactions via the ridesharing platform 360. As a person skilled in the art of the present technology may appreciate, the example of the user database 352 should not be construed as being limitative and others data rows and/or types of information may be stored therein without departing from the scope of the present technology.

Figure 4:
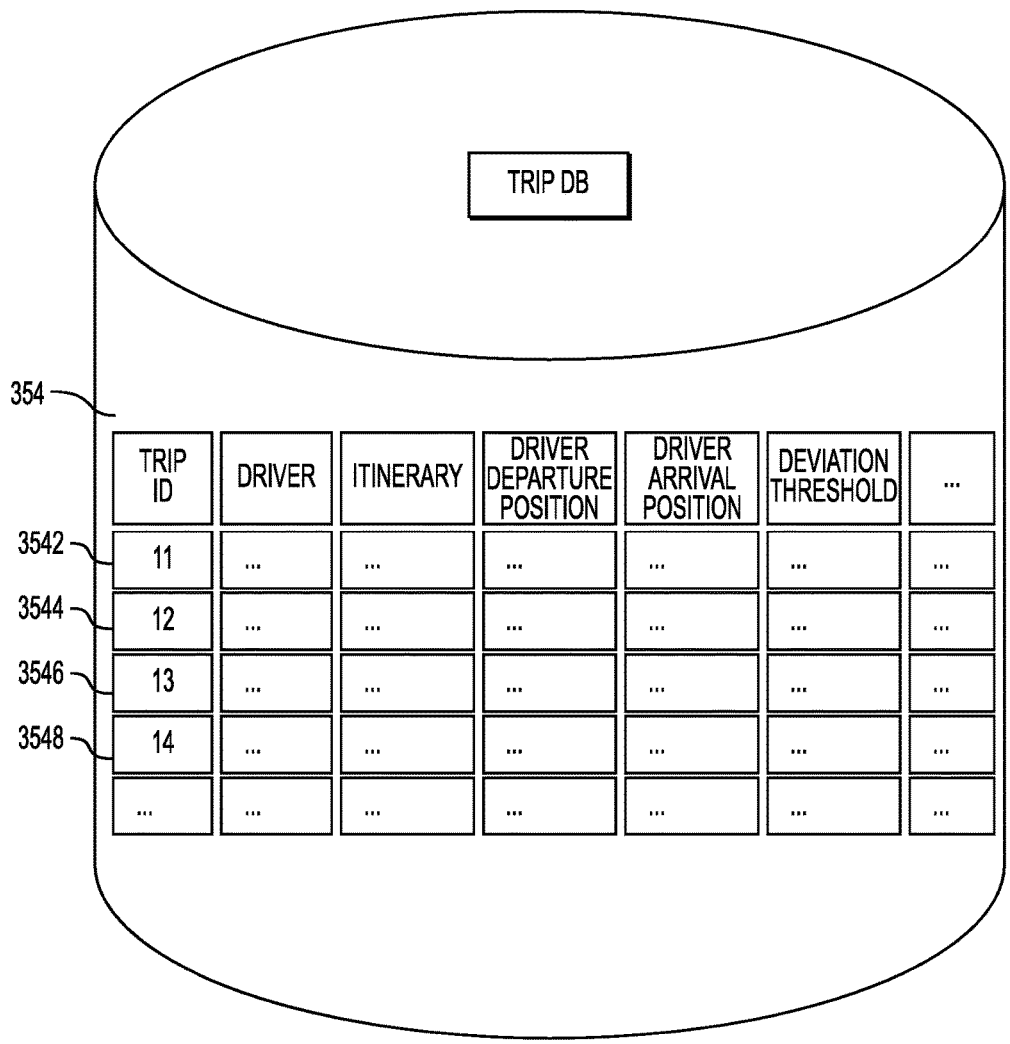
FIG. 4 is a diagram of a second database in accordance with an embodiment of the present technology.

Turning now to FIG. 4, an example of a data structure of the trip database 354 is illustrated. In this example, the data structure comprises multiple rows, each one of the rows allows storing of data relating to a trip. The trip database 354 allows storing of trip data such as, for a given trip, a unique trip ID, a driver associated with the given trip (which may be a key to the user database 352), an itinerary (which may be defined by multiple geographical coordinates, including waypoints located between a driver departure position and a driver arrival position), a driver departure position (which may be defined by geographical coordinates), a driver arrival position (which may be defined by geographical coordinates), a deviation threshold, etc. In some embodiments, the deviation threshold may comprise a boolean identifying whether the driver accepts a detour or not. In some embodiments, the deviation threshold may also comprise maximal detour duration, a maximal detour distance, a minimal duration with a passenger and/or a minimal distance with a passenger. In some embodiments, the maximal detour duration, the maximal detour distance, the minimal duration with a passenger and/or the minimal distance with a passenger may be absolute (e.g., a distance in kilometers, a duration in seconds, minutes or hours, etc) or relative (e.g., a percentage of a distance and/or of a duration). In some embodiments, a trip may also be associated with an original route (which may be, in some embodiments, be referred to as an itinerary). The original route may comprise various parameters such as a trajectory which may be determined by a mapping engine, a realistic duration which may also be generated by a mapping engine and/or a driver realistic distance which may also be generated by a mapping engine. In some embodiments, the adjective "realistic" refers to a distance and/or a duration which may be an estimate of a distance and/or duration the driver will/shall expect in real-life. This in contrast with distances and/or durations which values do not reflect what would happen in real-life. In the illustrated embodiment, the trip database 354 comprises four trips, each associated with a unique trip ID, namely "11" referred to as 3542, "12" referred to as 3544, "13" referred to as 3546 and "14" referred to as 3548. As a person skilled in the art of the present technology may appreciate, the example of the trip database 354 should not be construed as being limitative and others data rows and/or types of information may be stored therein without departing from the scope of the present technology.

Figure 5:
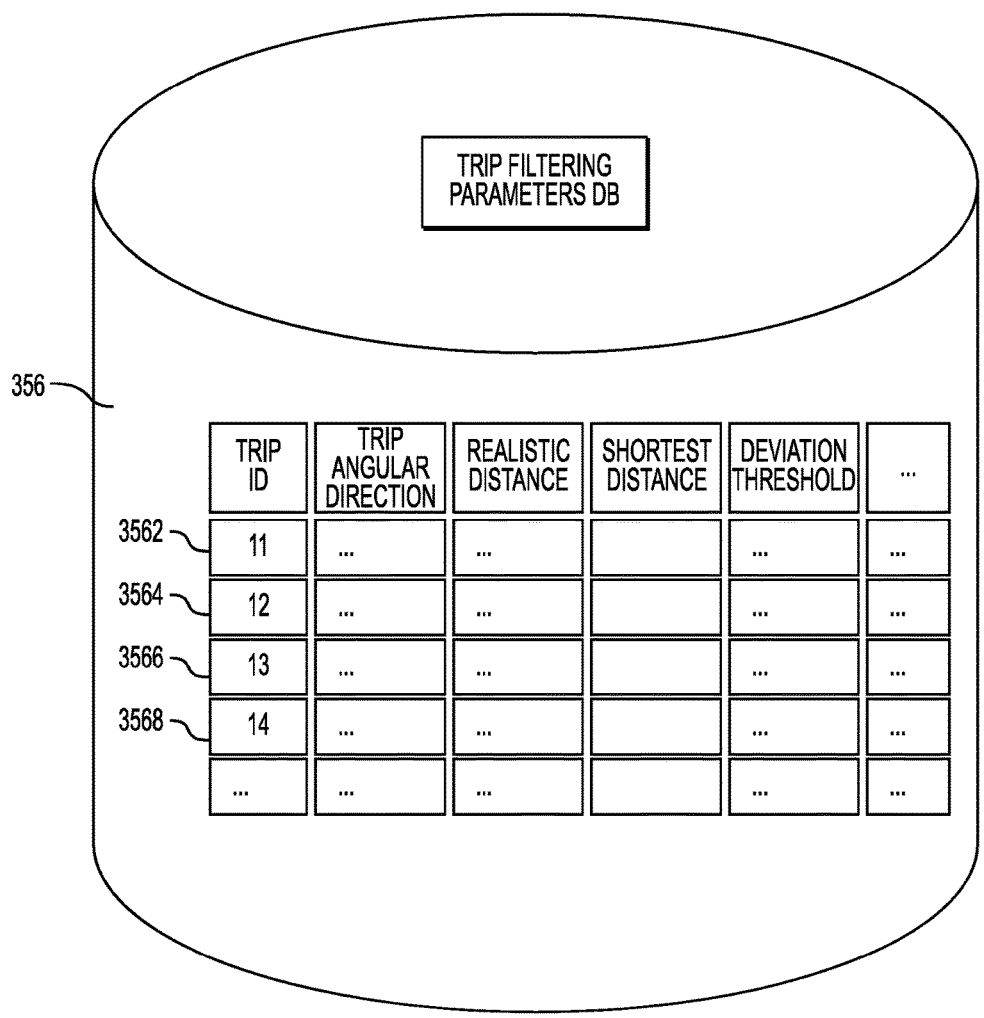
FIG. 5 is a diagram of a third database in accordance with an embodiment of the present technology.

Turning now to FIG. 5, an example of a data structure of the trip filtering parameters database 356 is illustrated. In this example, the data structure comprises multiple rows, each one of the rows allows storing of data relating to a trip, in particular trip filtering parameters. The trip filtering parameters may be generated and stored in the trip filtering parameters database 356 upon creation and/or publication of a trip by a driver. The trip filtering parameters database 356 allows storing of data which may be relied upon to determine whether, upon receipt of a rideshare request from a passenger, a given trip may be a candidate for a detoured trip or not. In the example of FIG. 5, the trip filtering parameters database 356 may store various information, such as, for a given trip, a unique trip ID, a trip angular direction (more details on this aspect are provided in the paragraphs below), a realistic distance (which may also be referred to as an actual distance), a shortest distance and/or a deviation threshold. In some embodiments, a given trip ID of the trip filtering parameters database 356 may correspond to a trip stored in the trip database 354, as it is the case the example of FIG. 5. In some embodiments, the realistic distance may be a distance computed by a mapping engine so as to generate a simulated value of a distance that the driver will actually have to drive between a driver departure position and a driver arrival position. In some embodiments, the shortest distance may be a direct distance between two points, also referred to as "as the crow flies" distance which, in some embodiments, may be computed based on the "great-circle distance" or the "Vincenty's" formulae. As for the trip database 354, in some embodiments, the deviation threshold may comprise a boolean identifying whether the driver accepts a detour or not. In some embodiments, the deviation threshold may also comprise maximal detour duration, a maximal detour distance, a minimal duration with a passenger and/or a minimal distance with a passenger. In some embodiments, the deviation threshold may be identical to the deviation threshold of the trip database 354.

In the illustrated embodiment, the trip filtering parameters database 356 comprises trip filtering parameters associated with four trips, namely "11" referred to as 3562, "12" referred to as 3564, "13" referred to as 3566 and "14" referred to as 3568. As a person skilled in the art of the present technology may appreciate, the example of the trip filtering parameters database 356 should not be construed as being limitative and others data rows and/or types of information may be stored therein without departing from the scope of the present technology. In addition, even though the trip database 354 and the trip filtering parameters database 358 are represented as two distinct databases, it should be understood that they can form a single database which may be referred to a trip database. Other variations are also possible and will become apparent to the person skilled in the art of the present technology.

Figure 6:
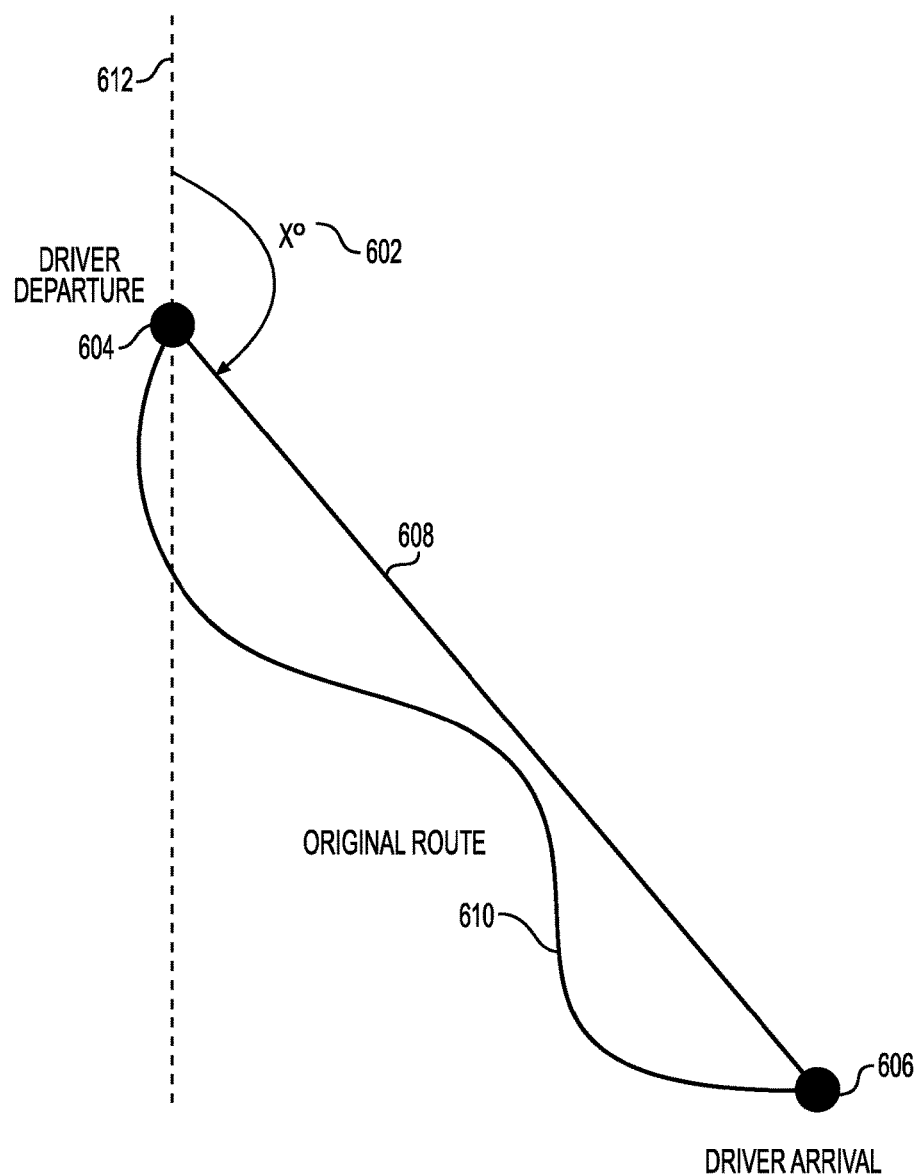
FIGS. 6 to 10 are diagrams illustrating operations in accordance with various embodiments of the present technology.

Turning now to FIG. 6, an example of how one or more trip filtering parameters are generated is illustrated. In some embodiments, the trip filtering parameters may be generated by the trip creation processing module 376 during creation of a new trip by a driver. For purpose of simplifying the description below, reference will be made to "parameters" to refer to the trip filtering parameters. The parameters may comprise one or more parameter. In the embodiment illustrated at FIG. 6, a first parameter X 602 is calculated, for example, by a processor of a server hosting the trip creation processing module 376, based on a driver departure position 604 and a driver departure position 606. In some embodiments an original route 610 is computed, for example, by a mapping engine. In some embodiments, the original route 610 may comprise a trajectory, a duration and/or a driver realistic distance. As the person skilled in the art of the present technology will appreciate, the trajectory may be established according to different methods and may take the form of various computer-implemented formats, such as, but not limited to, a series of waypoints between the driver departure position and the driver arrival position. In some embodiments, the driver may manually specify at least some of the waypoints of the original route (for example, a driver which to go from Paris to Lyon via Dijon). The first parameter X 602 is determined based on a line segment 608 extending from the driver departure position 604 to the driver arrival position 606. The line segment 608 allows determining the first parameter X 602 which may be defined as an angular direction of the original route 610. In some embodiments, the angular direction is defined as being an angle between the line segment 608 and a reference line 612 crossing the driver departure position 604. In some embodiments, the angular direction may equally be referred to as "bearing" or "compass bearing". In some embodiments, where the first parameter X 602 is generated based on a driver departure position and a driver arrival position, the first parameter X 602 may be referred to as a driver angular direction or a driver direction. In some embodiments, the first parameter X 602 may be a value in degrees. Other units may also be used and will become apparent to the person skilled in the art of the present technology. In some embodiments, the angular direction may be relied upon by the rideshare request processing module 378 to determine if a trip associated with the angular direction is in a similar direction that a trip associated with a rideshare request (or, in contrast, determine if a trip associated with the angular direction is in an opposite direction to a trip associated with a rideshare request).

Figure 7:
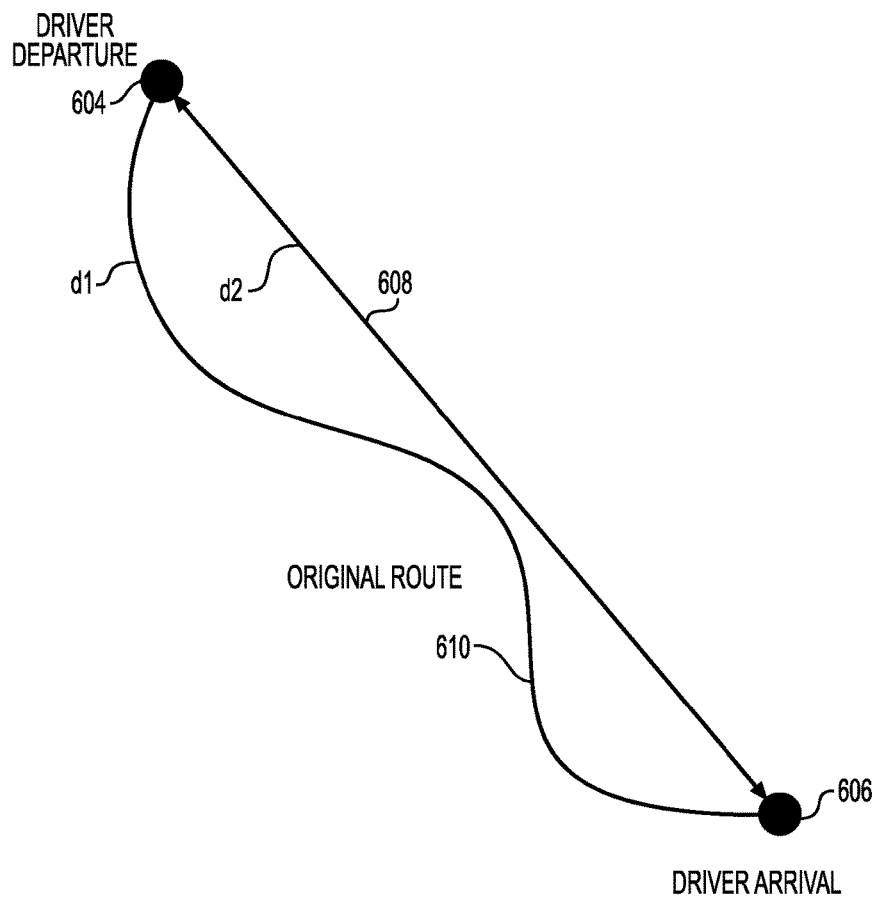

Turning now to FIG. 7, an example of how a second parameter and a third parameter (which may be both trip filtering parameters) are generated is illustrated. In some embodiments, the second parameter and the third parameter may be generated by the trip creation processing module 376 during creation of a new trip by a driver. In the embodiment illustrated at FIG. 7, a second parameter d1 and a third parameter d2 are calculated, for example, by a processor of a server hosting the rideshare request processing module 378, based on a driver departure position 604 and a driver departure position 606. In some embodiments the original route 610 is computed, for example, by a mapping engine. In some the first parameter X 602, the second parameter d1 and the third parameter d2 embodiments, a realistic distance of the original route 610 may define the second parameter d1. As the person skilled in the art of the present technology will appreciate, the realistic distance may be established according to different methods and may take the form of a value defining a distance, such as number of kilometers or miles. The third parameter d2 may be defined by a distance associated with the line segment 608 and which may also be referred to as a shortest distance between the driver departure position 604 and the driver arrival position 606 represented by a line segment 608 extending from the driver departure position 604 to the driver arrival position 606. In some embodiments, the third parameter d2 may also referred to as "as the crow flies" distance which, in some embodiments, may be computed based on the "great-circle distance" or the "Vincenty's" formulae. As the person skilled in the art of the present technology will appreciate, the realistic distance may take the form of a value defining a distance, such as number of kilometers or miles. Other units may also be used and will become apparent to the person skilled in the art of the present technology.

In some embodiments, the first parameter X 602, the second parameter d1 and the third parameter d2 may define trip filtering parameters. In some embodiments, the trip filtering parameters comprise at least one of the first parameter X 602, the second parameter d1 and the third parameter d2. In some embodiments, the first parameter X 602, the second parameter d1 and the third parameter d2 are generated along with trip data associated with a trip during its creation by a user. In some embodiments, the first parameter X 602, the second parameter d1 and the third parameter d2 are generated a later time. In some embodiments, the trip filtering parameters are stored in a dedicated database, such as the trip filtering parameters database 356 while other trip data associated with a trip is stored in a different database, such as the trip database 354. In some alternative embodiments, both the trip filtering parameters and the trip data are stored in a same database. In addition, and as the person skilled in the art of the present technology will appreciate, the first parameter X 602, the second parameter d1 and the third parameter d2 are provided as examples of what trip filtering parameters may be. Other variations may become apparent to the person skilled in the art of the present technology. In some embodiments, the trip filtering parameters allow to later determine whether a trip may be a candidate for computing a detoured trip based on the trip without requiring a computation of a detoured trip to be generated. This provides multiple benefits, in particular, but not limited to, when a ridesharing platform manages an important volume of trips which are searchable by passengers looking for available seats.

Figure 8:
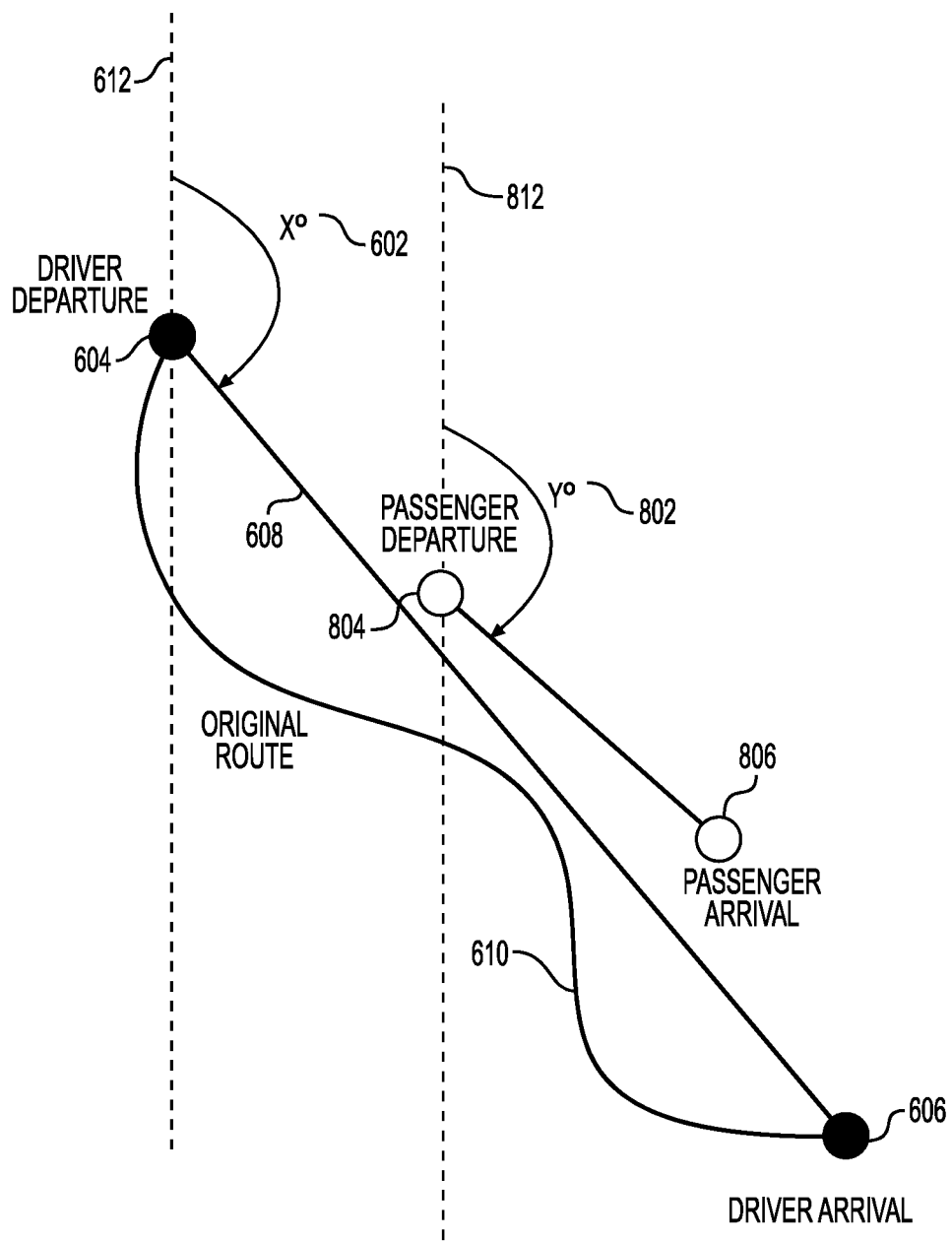

Turning now to FIG. 8, a first example as to how the ridesharing platform 360 may determine that a trip may be a candidate for which a detour route is to be computed is illustrated. In this example, the ridesharing platform 360 receives a rideshare request from a passenger, the rideshare request comprising a search departure position 804 (also referred to as a passenger departure position) and a search arrival position 806 (also referred to as a passenger arrival position). The ridesharing platform 360, generates a first search parameter 802 (also referred to as a rideshare request parameter). The first search parameter Y 802 may also be referred to as a first direction, a search bearing or a search compass bearing. The first search parameter Y 802 may be generated according to a computation method similar to the computation method described above for generating the first parameter X 602. In some embodiments, the first search parameter Y 802 is compared to a set of trip filtering parameters associated with trips previously created by drivers and accessed from the trip filtering parameters database 356. In some embodiments, a heuristic function may be applied to determine if the first search parameter Y 802 is similar to one or more of the trip filtering parameters of the set of trip filtering parameters. In the illustrated embodiment of FIG. 8, the first search parameter Y 802 is compared to the first parameter X 602. In this case, the heuristic function may determine that the first search parameter Y 802 is similar to the first parameter X 602. In some embodiments, the heuristic function may determine a similarity by comparing the first parameter X 602 to a range of values defined based on the first search parameter Y 802. In some embodiments, the range may be referred to as an acceptable angular direction range comprising a lower bound defined as (search angular direction−angular direction parameter) and an upper bound defined as (search angular direction+angular direction parameter). In this example, because the first parameter X 602 is within the range computed base on the first search parameter Y 802, the ridesharing platform 360 determines that a trip associated with the first parameter X 602 is a candidate for which a detoured trip is to be computed.

Figure 9:
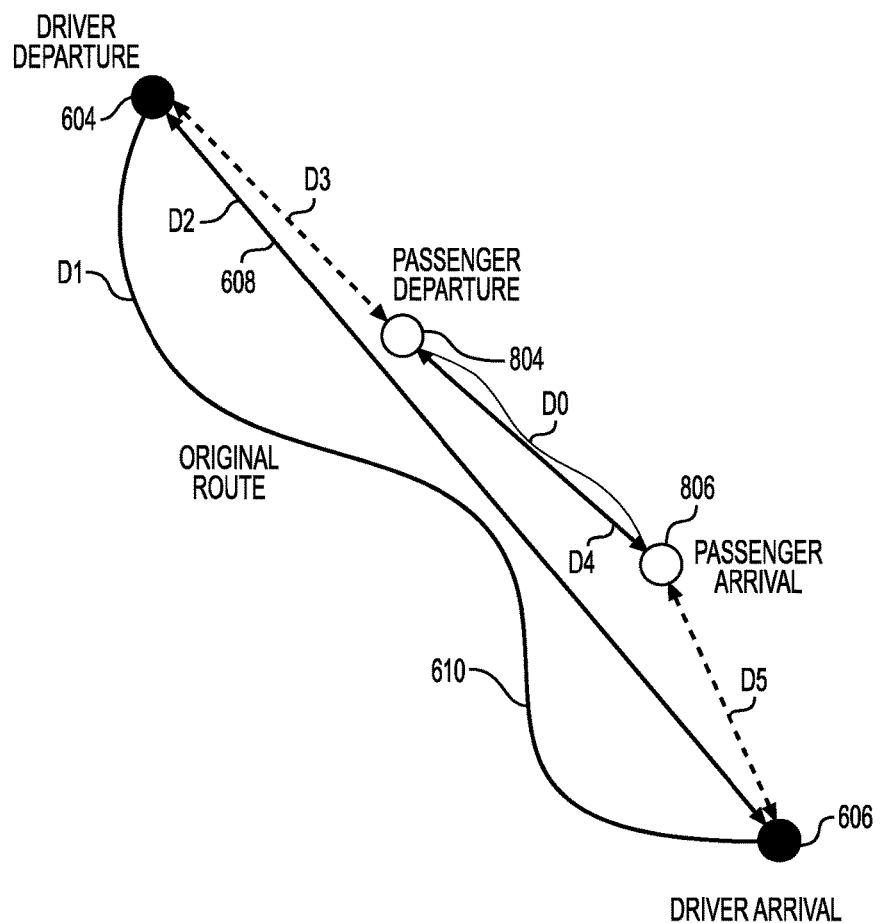

Turning now to FIG. 9, a second example as to how the ridesharing platform 360 may determine that a trip may be a candidate for which a detour route is to be computed is illustrated. In some embodiments, the method illustrated at FIG. 8 and the method illustrated at FIG. 9 may be combined together for the purpose of determining that a trip is a candidate for which a detoured trip is to be computed. In the second example, the ridesharing platform 360 also receives a rideshare request from a passenger, the rideshare request comprising the search departure position 804 and the search arrival position 806 (also referred to as a passenger arrival position). The ridesharing platform 360 generates a second search parameter d0. The second search parameter d0 may also be referred to as a search realistic distance associated with a realistic distance between the passenger departure position 804 and the passenger arrival position 806. The ridesharing platform 360 also generates a third search parameter d3. The third search parameter d3 may also be referred to as a first shortest distance associated with a shortest distance between the passenger departure position 804 and the driver departure position 604. The ridesharing platform 360 also generates a fourth search parameter d4. The fourth search parameter d4 may also be referred to as a third shortest distance associated with a shortest distance between the passenger departure position 804 and the passenger arrival position 806. The ridesharing platform 360 also generates a fifth search parameter d5. The fifth search parameter d5 may also be referred to as a second shortest distance associated with a shortest distance between the passenger arrival position 806 and the driver arrival position 606.

In this embodiment, the rideshare parameters comprise the second search parameter d0, the third search parameter d3 and the fifth search parameter d5. In some embodiments, the rideshare parameters may also comprise the fourth search parameter d4. In some embodiments, the ridesharing platform 360 accesses trip filtering parameters associated with trips previously created by drivers. In some embodiments, the trip filtering parameters comprise the deviation threshold, the deviation threshold being associated with at least one of an absolute deviation distance, a relative deviation distance, an absolute deviation duration and a relative deviation duration. In this example, the ridesharing platform 360, upon determining that a deviation threshold associated with the trip associated with the original route 610 is no more than a value based on the following equation: (third search parameter d3+second search parameter d0+fifth search parameter d5-driver realistic distance d1), then the ridesharing platform 360 may determine that the trip associated with the original route 610 is a candidate for which a detour route is to be computed.

Figure 10:
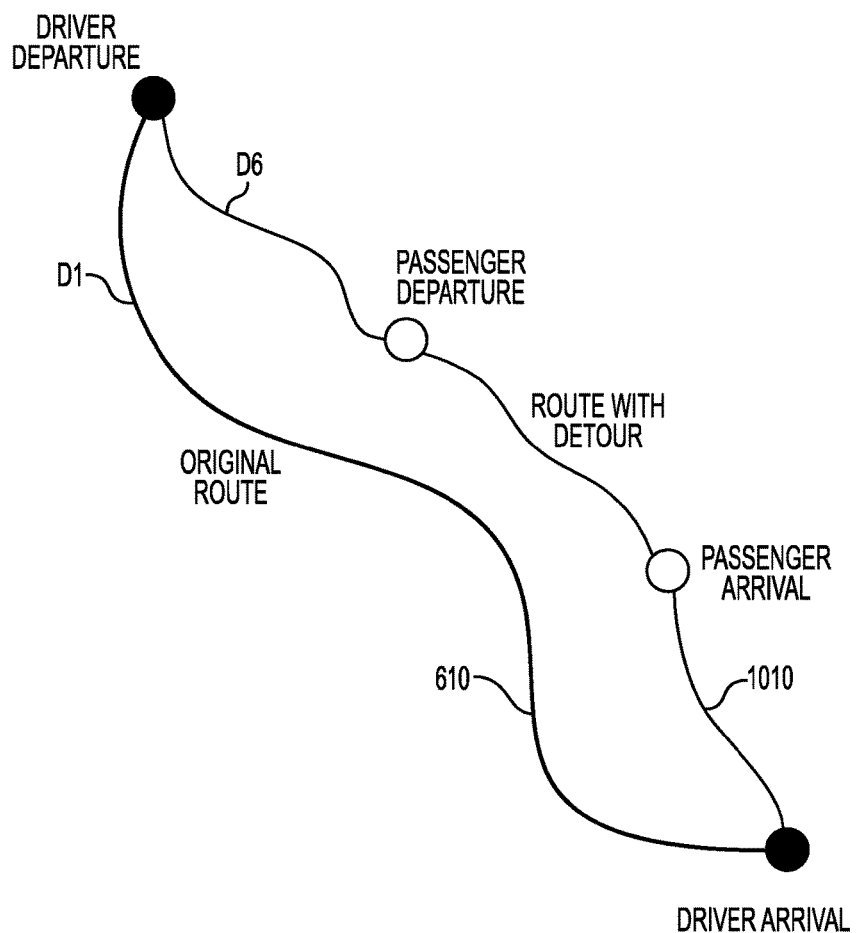

Turning now to FIG. 10, an illustration of a computed detour route 1010 is shown. In this example, the ridesharing platform 360, based on the method illustrated at FIG. 8 and/or the method illustrated at FIG. 9 determined that the trip associated with the original route 610 is a candidate for which a detoured trip is to be computed. In some other embodiments, the ridesharing platform may have made that determination based on different methods than the ones illustrated at FIGS. 8 and 9. In some embodiments, other trips associated with various original routes may also have been identified as candidates for which detoured trips are to be computed. In the example illustrated at FIG. 10, the detour route 1010 may be generated by the detour module 380. In some embodiments, a detoured trip may be associated with the detour route 1010 and a deviation value reflective of a deviation between the original route 610 and the detour route 1010. In some embodiments, the detour route 1010 is the detoured trip. In some embodiments, for each one of the other trips associated with various original routes which have been identified as candidates for which detoured trips are to be computed, detoured trips are also computed. In such embodiments, the ridesharing platform 360 may then rely on the associated deviation value to order and/or select the trips to be presented to the passenger having sent the rideshare request.

Figure 11:
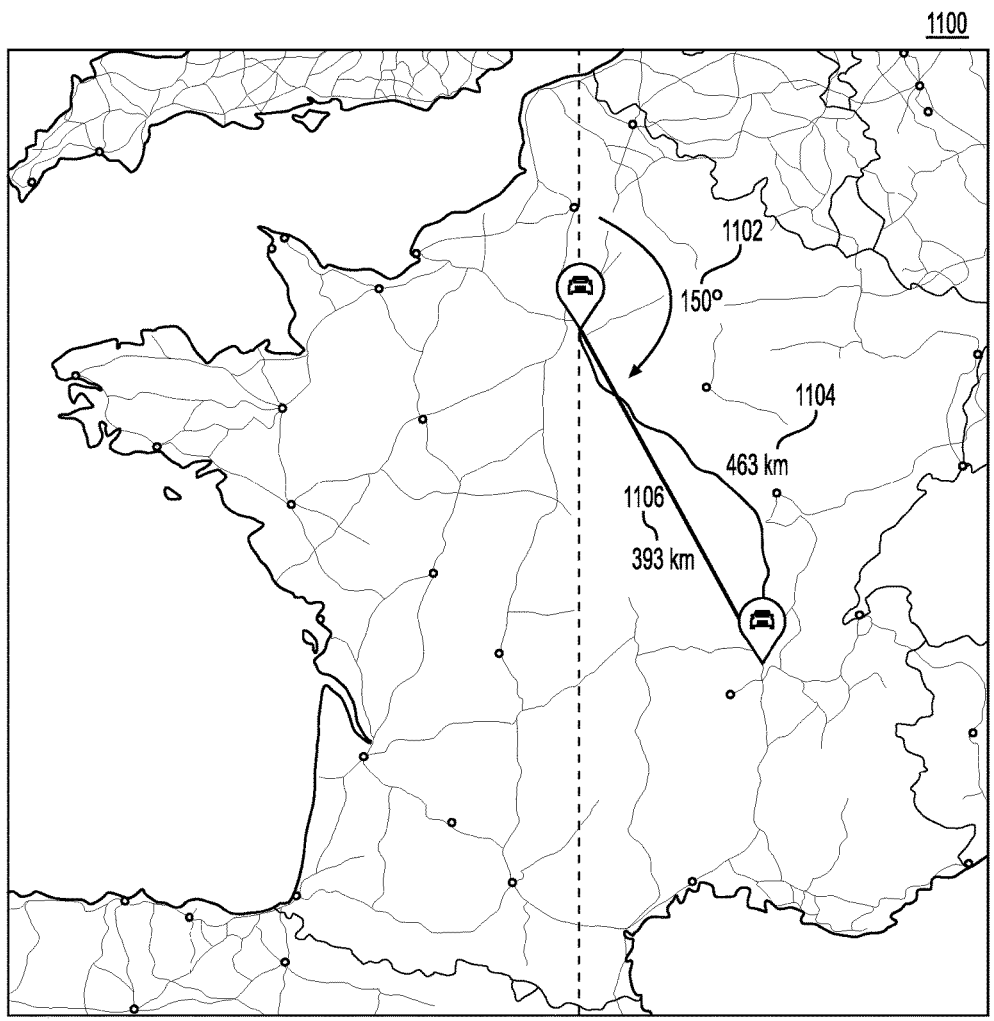
FIGS. 11 to 13 illustrate examples of operations conducted in accordance with various embodiments of the present technology.
Figure 12:
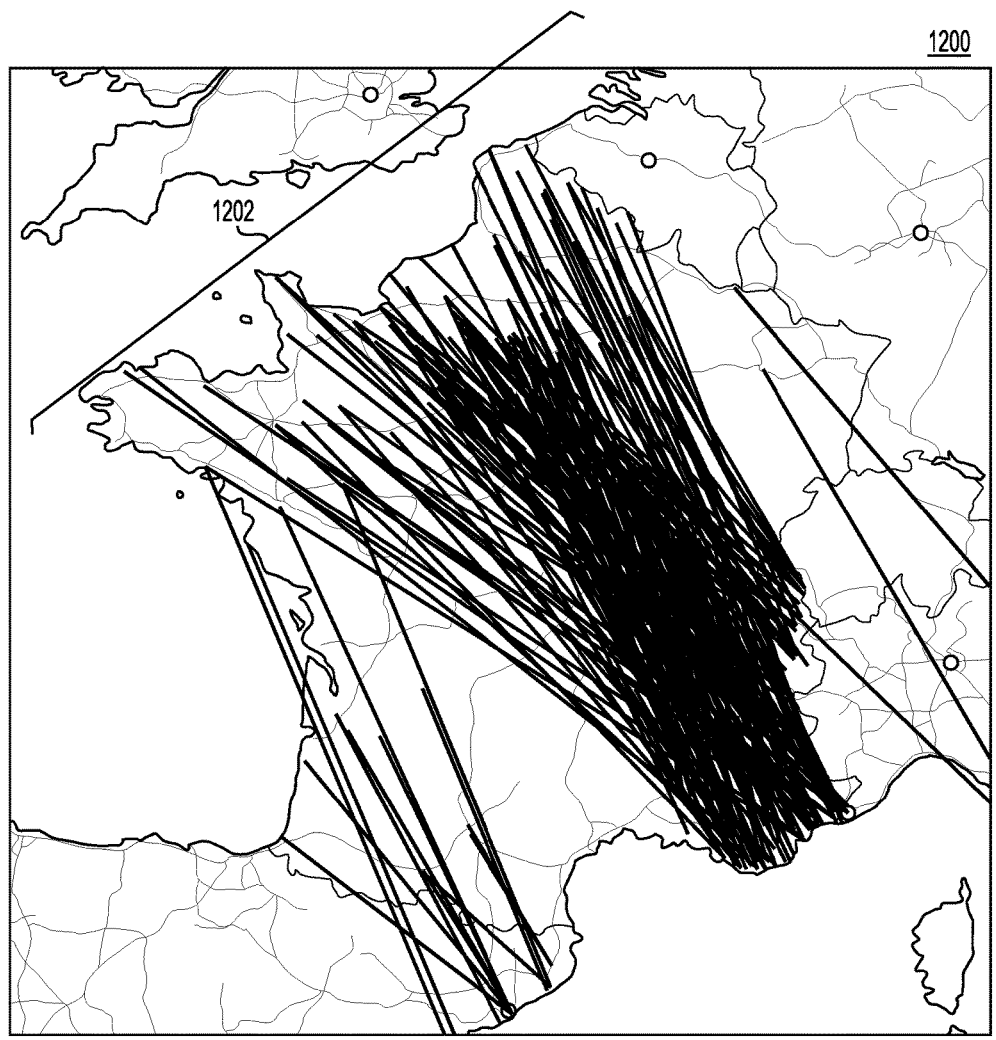
Figure 13:
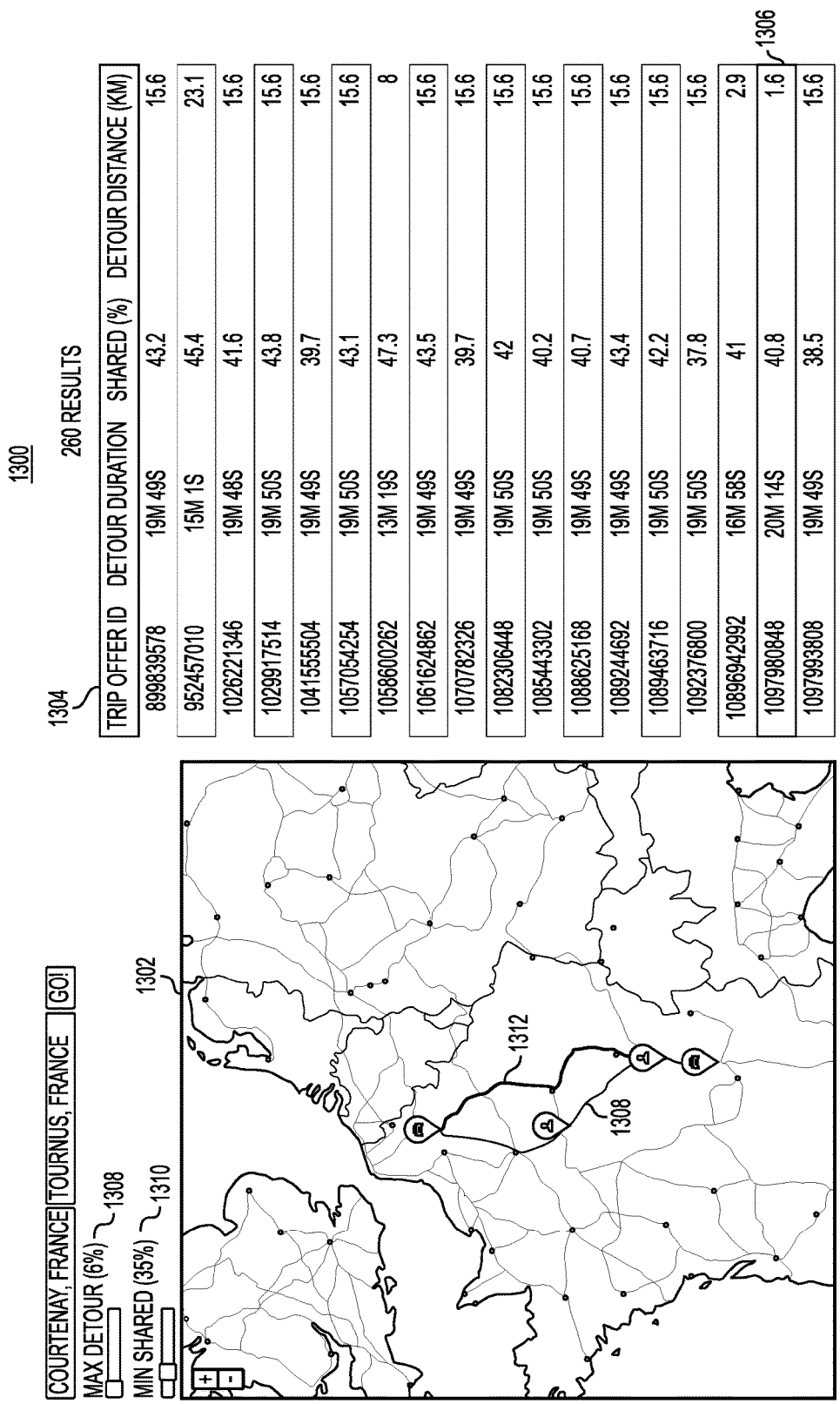

Turning now to FIG. 11 to FIG. 13, example of how trip filtering parameters associated with a trip are created and then relied upon to generate a detoured trip is depicted. A visual representation 1100 of FIG. 11, illustrates a driver creating a new trip with driver departure position being Paris and a driver arrival position being Lyon. The ridesharing platform 360, upon creating the trip in the system, generated a first trip filtering parameter 1102 associated with a trip angular direction, a second trip filtering parameter 1104 associated with a trip realistic distance (i.e., an actual distance that a driver has to drive with a vehicle, such as a car, to go from Paris to Lyon according to a certain itinerary) and a third trip filtering parameter 1106 associated with a shortest distance between the driver departure position and the driver arrival position. In this example, the first trip filtering parameter 1102 is associated with an angle of 150 degrees, the second trip filtering parameter 1104 is associated with a distance of 463 kilometers and the third trip filtering parameter 1106 is associated with a distance of 393 kilometers.

In the visual representation 1200 of FIG. 12, a set of trip filtering parameters 1202 is represented. Each one of the lines illustrates directions of routes associated with a plurality of trips previously created by drivers. Each one of the directions may be associated with a trip angular direction. In this example, the ridesharing platform 360 upon receiving a rideshare request, generates one or more rideshare parameters, such as a search angular direction. The one or more rideshare parameters (in this example, the search angular direction) is analysed by being compared to the trip angular directions associated with the plurality of trips so as to identify which one of the trips amongst the plurality of trips may be candidate from which a detoured trip may be generated. In this example, this determination may be made by comparing, for each trip angular direction, whether its value is comprised within a range generated based on the search angular direction. If the trip angular direction is within the range, then the trip associated with the trip angular direction is identified as a candidate. If not, it is discarded. In this example, the set of trip filtering parameters 1202 are associated with trips identified as candidates.

Turning now to the visual representation 1300 of FIG. 13, a detoured trip going through Courtenay and Tournus is illustrated on a map 1302. In this example, a passenger has entered a search departure position as being Courternay and a search arrival position as being Tournus. Upon, the receiving the rideshare request, the ridesharing platform 360 may generate one or more rideshare request parameters. The one or more rideshare request parameters may comprise a search angular direction. The search angular direction is then compared to trip angular directions (i.e., trip filtering parameters) of previously created trips. For the trips for which the trip angular direction is similar to the search angular direction, detoured trips are computed. In some embodiments, computation of the detoured trips may be parallelized as they are independent. The list 1304 illustrates a list of detoured trips, each line corresponding to a different detoured trip. As an example, a detoured trip 1306 is associated with a detour duration of 20 minutes and 14 seconds, a shared percentage of 40.8 per cents and a detour distance of 1.6 kilometers. The detoured trip 1306 is also associated with a detour route 1308 visually represented. The detoured trip 1306 may have been computed based on one of trips for which the trip angular direction is similar to the search angular direction. A maximum detour 1308 of 6 per cents and a minimum time shared with the passenger 1310 of 35 per cents are also illustrated. The maximum detour 1308 and the minimum time shared with the passenger 1310 may be associated with an original trip 1312 based on which the detoured trip 1306 has been computed.

Having described, with reference to FIG. 1 to FIG. 13, some non-limiting example instances of systems and computer-implemented methods used in connection with the creation of a trip and the processing of a rideshare request in a ridesharing platform, we shall now describe a general solution to this problem with references to FIG. 14 to FIG. 17.

Figure 14:
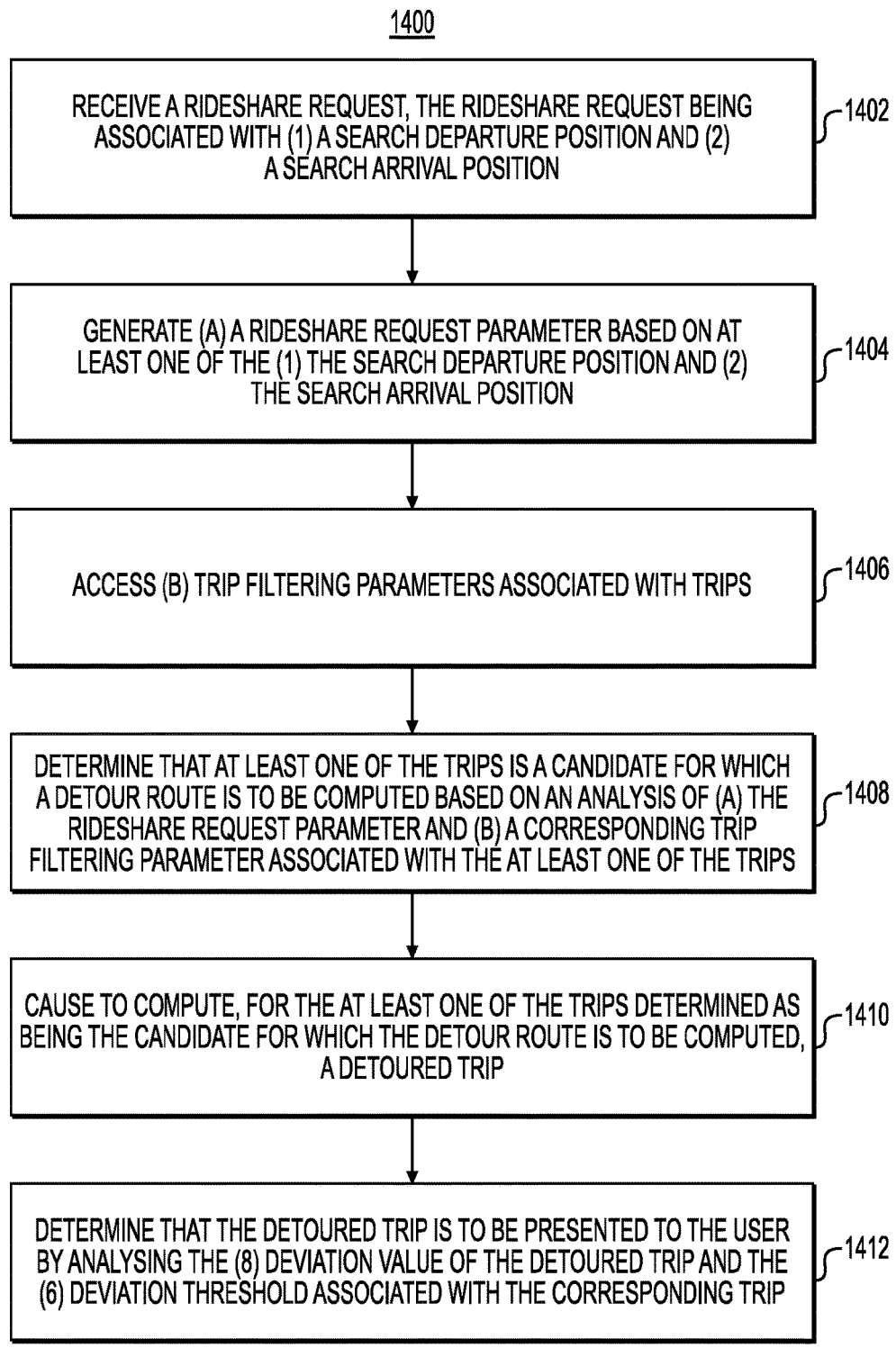
FIG. 14 is a flowchart illustrating a first computer-implemented method implementing embodiments of the present technology.
Figure 15:
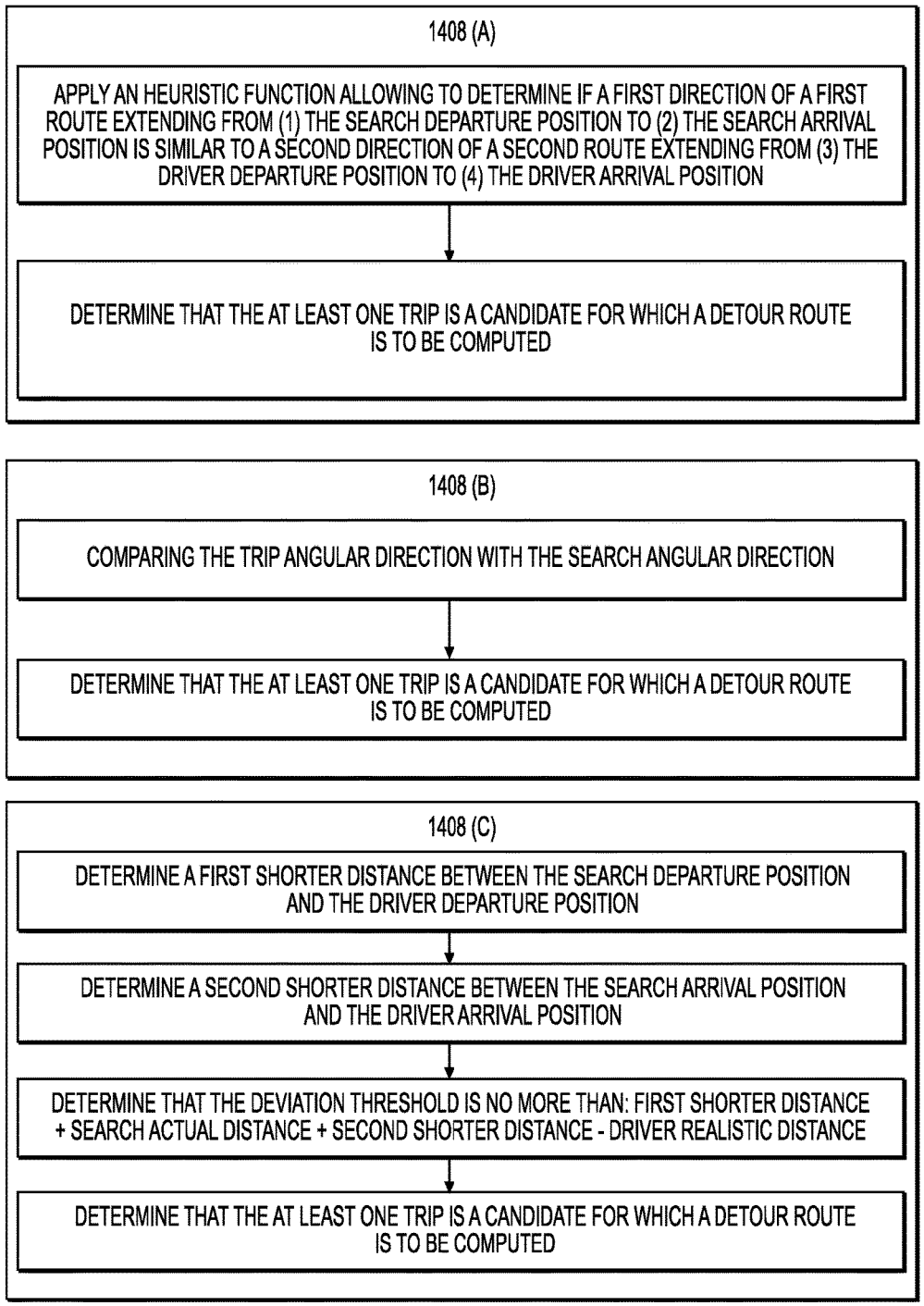
FIGS. 15 and 16 are flowcharts of alternative computer-implemented methods to be used in connection with the first computer-implemented method of FIG. 14.
Figure 16:
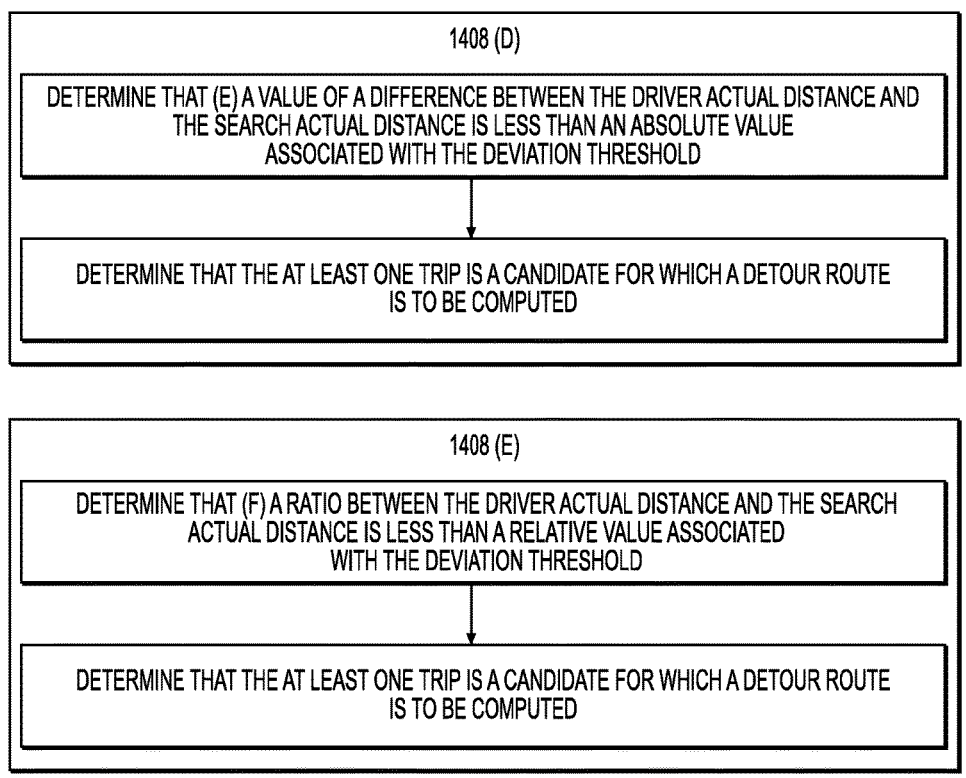

More specifically, FIG. 14 to FIG. 16 show a flowchart illustrating a first computer-implemented method 500 implementing embodiments of the present technology. The computer-implemented method of FIG. 14 may comprise a computer-implemented method executable by a processor of the one or more servers 340, 342 and 344, the method comprising a series of steps to be carried out by the one or more servers 340, 342 and 344.

The computer-implemented method of FIG. 14 may be carried out, for example, in the context of the one or more servers 340, 342 and 344 by the processor 110 executing program instructions having been loaded into random access memories 130 from solid-state drives 120 of the one or more servers 340, 342 and 344.

The method 1400 allows determining a detoured trip to be presented to a potential passenger. The method 1400 starts a step 1402 by receiving, from an electronic device associated with a potential passenger, a rideshare request, the rideshare request being associated with (1) a search departure position and (2) a search arrival position.

Then, at a step 1404, the method 1400 proceeds to generating, by a processor, (A) a rideshare request parameter based on at least one of (1) the search departure position and (2) the search arrival position. In some embodiments, generating the rideshare request parameter comprises determining, by the processor, a search angular direction based on the search departure position and the search arrival position. In some embodiments, determining the search angular direction is further based on an angular direction parameter defining an acceptable angular direction range, the acceptable angular direction range comprising a lower bound defined as (search angular direction−angular direction parameter) and an upper bound defined as (search angular direction+angular direction parameter). In some embodiments, the corresponding trip filtering parameters associated with the at least one of the trips comprises a trip angular direction determined based on a corresponding driver departure position and a corresponding driver arrival position.

In some embodiments, generating the rideshare request parameter comprises causing to compute a search realistic distance between the search departure position and the search arrival position. In some embodiments, the corresponding trip filtering parameter associated with the at least one of the trips comprises the driver departure position and the driver arrival position.

At a step 1406, the method 1400 proceeds to accessing, from a database, (B) trip filtering parameters associated with trips, each one of the trips being associated with (3) a driver departure position, (4) a driver arrival position, (5) an original route from the driver departure position to the driver arrival position and (6) a deviation threshold reflective of an acceptable deviation from the original route, each one of the trip filtering parameters having been generated based on at least one of (3) the driver departure position, (4) the driver arrival position, (5) the original route and (6) the deviation threshold.

At a step 1408, the method 1400 proceeds to determining, by the processor, that at least one of the trips is a candidate for which a detour route is to be computed based on an analysis of (A) the rideshare request parameter and (B) a corresponding trip filtering parameter associated with the at least one of the trips. In some embodiments, the analysis of (A) the rideshare request parameter and (B) the corresponding trip filtering parameter associated with the at least one of the trips comprises comparing the trip angular direction with the search angular direction.

Then, at a step 1410, the method 1400 proceeds to causing to compute, for the at least one of the trips determined as being the candidate for which the detour route is to be computed, a detoured trip, the detoured trip being associated with (7) a detour route and (8) a deviation value associated with the detour route and reflective of a deviation between the original route and the detour route. In some embodiments, causing to compute a detoured trip comprises:

transmitting, to a routing engine, at least one of the rideshare request, the search departure position, the search arrival position, the rideshare request parameter, the at least one of the trips, a corresponding original route associated with the at least one of the trips, a corresponding driver departure position associated with the at least one of the trips, a corresponding driver arrival position associated with the at least one of the trips and the corresponding trip filtering parameter;

causing the routing engine to generate the detoured trip by computing a detoured route based on the at least one of the rideshare request, the search departure position, the search arrival position, the rideshare request parameter, the at least one of the trips, the corresponding original route associated with the at least one of the trips, the corresponding driver departure position associated with the at least one of the trips, the corresponding driver arrival position associated with the at least one of the trips and the corresponding trip filtering parameter; and receiving, from the routing engine, the detoured trip.

At a step 1412, the method 1400 proceeds to determining, by the processor, that the detoured trip is to be presented to the potential passenger by analysing the (8) deviation value of the detoured trip and the (6) deviation threshold.

In some embodiments, the method 1400 may also comprise a step of transmitting, to the electronic device, data associated with the detoured trip for displaying to the potential passenger.

In some embodiments, determining that the at least one of the trips is the candidate for which the detour route is to be computed is executed prior to the detour route being computed.

In some embodiments, the corresponding trip filtering parameter allows determining whether the trip associated with the corresponding trip filtering parameter is a candidate for which a detour route is to be computed for a given rideshare request.

In some embodiments, determining that the at least one of the trips is a candidate for which a detour route is to be computed based on the analysis of (A) the rideshare request parameter and (B) the corresponding trip filtering parameters associated with the at least one of the trips comprises one of (C) adding the at least one of the trips to a list of candidates for which a detour route is to be computed and (D) disregarding the at least one of the trips so that it is not added to the list of candidates.

In some embodiments, determining that the at least one of the trips is a candidate for which a detour route is to be computed based on an analysis of (A) the rideshare request parameter and (B) the corresponding trip filtering parameters associated with the at least one of the trips comprises applying an heuristic function allowing to determine if a first direction of a first route extending from (1) the search departure position to (2) the search arrival position is similar to a second direction of a second route extending from (3) a corresponding driver departure position associated with the at least one of the trips to (4) a corresponding driver arrival position associated with the at least one of the trips.

In some embodiments, the analysis of (A) the rideshare request parameter and (B) the corresponding trip filtering parameter associated with the at least one of the trips comprises:
   determining, by the processor, a first shortest distance between the search departure position and the driver departure position; and
   determining, by the processor, a second shortest distance between the search arrival position and the driver arrival position.

In some embodiments, the corresponding trip filtering parameter comprises a deviation threshold, the deviation threshold being associated with at least one of an absolute deviation distance, a relative deviation distance, an absolute deviation duration and a relative deviation duration.

In some embodiments, the analysis of (A) the rideshare request parameter and (B) the corresponding trip filtering parameter associated with the at least one of the trips comprises comparing the deviation threshold with the search realistic distance, the first shortest distance and the second shortest distance.

In some embodiments, upon determining that the deviation threshold is no more than a value based on the following equation:

the first shortest distance+the search realistic distance+the second shortest distance−a driver realistic distance,then determine that the at least one trip is a candidate for which a detour route is to be computed, the driver realistic distance being determined based on the driver departure position and the driver arrival position.

In some embodiments, the corresponding trip filtering parameter associated with the at least one of the trips comprises a driver realistic distance between the driver departure position and the driver arrival position.

In some embodiments, the analysis of (A) the rideshare request parameter and (B) the corresponding trip filtering parameter associated with the at least one of the trips comprises comparing the search realistic distance with the driver realistic distance.

In some embodiments, the deviation threshold comprises at least one of a maximal detour duration, a maximal detour distance, a minimal duration with a passenger and a minimal distance with a passenger.

In some embodiments, upon determining that one of (E) a value of a difference between the driver realistic distance and the search realistic distance is less than an absolute value associated with the deviation threshold and (F) a ratio between the driver realistic distance and the search realistic distance is less than a relative value associated with the corresponding deviation threshold:
   determine that the at least one of the trips is a candidate for which a detour route is to be computed.

In some embodiments, the deviation value is at least one of an absolute detour duration, an absolute detour distance, a relative detour duration and a relative detour distance.

In some embodiments, further to determining that the detoured trip is to be presented to the potential passenger, the method comprises, adding the detoured trip to a list of detoured trips. In some embodiments, the method further comprises sorting, by the processor, the list of detoured trips based on deviation values associated with each one of the detoured trips of the list of detoured trips. In some embodiments, transmitting the detoured trip for displaying to the potential passenger comprises transmitting the list of detoured trips.

In some embodiments, the detour route is based on the original route. In some embodiments, the detoured trip is further based on meeting points determined as an acceptable compromise between one of the search departure position and the search arrival position and a waypoint of the detoured route. In some embodiments, causing to compute the detoured trip is further based on an analysis of similarities between the original route and the detour route.

In some alternative embodiments, a method for determining a detoured trip may comprise the following steps:
   receiving, from an electronic device associated with a potential passenger, a rideshare request, the rideshare request being associated with (1) a search departure position and (2) a search arrival position;
   accessing, from a database, (B) trip filtering parameters associated with trips, each one of the trips being associated with (3) a driver departure position, and (4) a driver arrival position, each one of the trip filtering parameters having been generated based on at least one of the (3) driver departure position and (4) the driver arrival position;
   determining, by the processor, for at least one the trips, that the at least one trip is a candidate for which a detour route is to be computed based on an analysis of the (1) the searched departure position and (2) the searched arrival position and (B) the trip filtering parameters;
   causing to compute, for the at least one trip determined as being a candidate for which a detour route is to be computed, a detoured trip; and
   storing, in a non-transitory computer readable medium, the detoured trip.

In some alternative embodiments, a method for determining a detoured trip may comprise the following steps:
   receiving, from an electronic device, a rideshare request associated with a potential passenger, the rideshare request being associated with (1) a search departure position and (2) a search arrival position;
   accessing, from a database, parameters associated with trips, the parameters being associated with (3) a driver departure position, (4) a driver arrival position and (6) a deviation threshold reflective of an acceptable deviation from an original route between the driver departure position and the driver arrival position;
   identifying, by a processor, a set of trip candidates for which a detour route is to be computed based on an analysis of the rideshare request and the parameters associated with the trips;
   causing to compute, for at least one trip candidate of the set of trip candidates, a detoured trip associated with (7) a detour route and (8) a deviation value associated with the detour route and reflective of a deviation between the original route and the detour route;
   generating, by the processor, a list of detoured trips based on a determination that, for the at least one of the candidate, the computed deviation value does not exceed the deviation threshold associated with a corresponding trip; and storing, in a non-transitory computer readable medium, the list of detoured trips.

Figure 17:
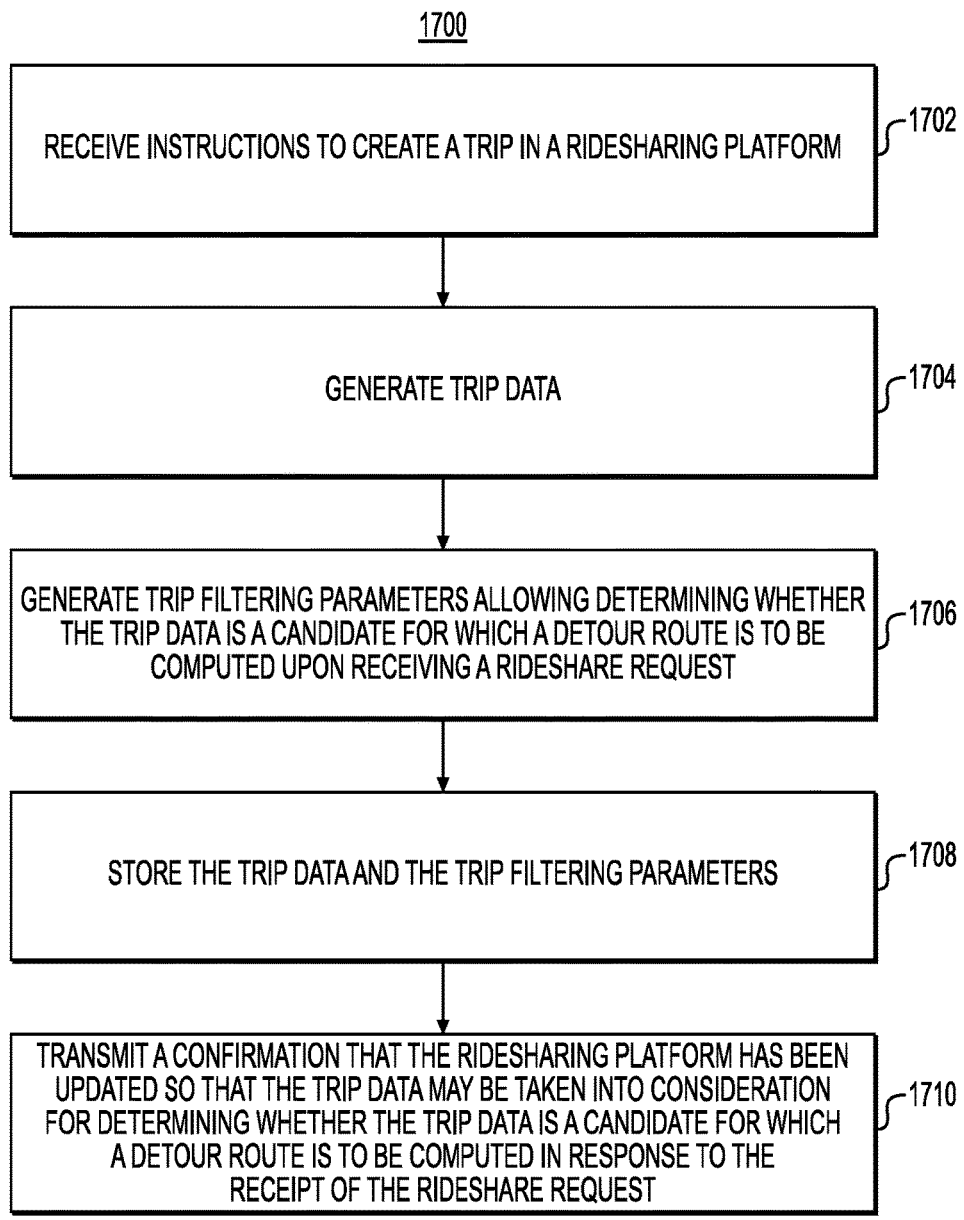
FIG. 17 is a flowchart illustrating another computer-implemented method implementing embodiments of the present technology.

As for the computer-implemented methods of FIG. 14 to FIG. 16, the computer-implemented method of FIG. 17 may be carried out, for example, in the context of the one or more servers 340, 342 and 344 by the processor 110 executing program instructions having been loaded into random access memories 130 from solid-state drives 120 of the one or more servers 340, 342 and 344.

The method 1700 allows generating trip filtering parameters allowing determining whether the trip data is a candidate for which a detour route is to be computed upon receiving a rideshare request.

The method 1700 starts at a step 1702 by receiving, from an electronic device associated with a driver, instructions to create a trip in a ridesharing platform, the instructions being associated with (1) a driver departure position, (2) a driver arrival position and (3) a deviation threshold reflective of an acceptable deviation from an original route from the driver departure position to the driver arrival position.

At a step 1704, the method 1700 proceeds to generating, by a processor, trip data, the trip data being associated with (1) the driver departure position and (2) the driver arrival position.

At a step 1706, the method 1700 proceeds to generating, by the processor, trip filtering parameters allowing determining whether the trip data is a candidate for which a detour route is to be computed upon receiving a rideshare request, the rideshare request comprising (4) a search departure position and (5) a search arrival position, the trip filtering parameters being generated based on at least one of the (1) driver departure position, (2) the driver arrival position and (3) the deviation threshold.

In some embodiments, the method 1700 may comprise storing, in a first database, the trip data.

At a step 1708, the method 1700 proceeds to storing, in a second database, the trip filtering parameters.

At a step 1710, the method 1700 proceeds to transmitting, to the electronic device, a confirmation that the ridesharing platform has been updated so that the trip data may be taken into consideration for determining whether the trip data is a candidate for which a detour route is to be computed in response to the receipt of the rideshare request.

In some embodiments, allowing determining whether the trip is a candidate for which a detour route is to be computed does not require the detour route to be computed.

In some embodiments, the first database and the second database are a same database.

In some embodiments, generating trip filtering parameters comprises computing an angular direction based on the driver departure position and the driver arrival position.

In some embodiments, the deviation threshold is associated with at least one of an absolute deviation distance and a relative deviation distance.

In some embodiments, generating the trip filtering parameters comprises computing a driver realistic distance between the driver departure position and the driver arrival position.

In some embodiments, the deviation threshold comprises at least one of a maximal detour duration, a maximal detour distance, a minimal duration with a passenger and a minimal distance with a passenger.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

As such, the methods and systems implemented in accordance with some non-limiting embodiments of the present technology can be represented as follows, presented in numbered clauses.

[Clause 1] A computer-implemented method for execution by a system, the method comprising:
receiving, from an electronic device associated with a potential passenger, a rideshare request, the rideshare request being associated with (1) a search departure position and (2) a search arrival position;
generating, by a processor, (A) a rideshare request parameter based on at least one of (1) the search departure position and (2) the search arrival position;
accessing, from a database, (B) trip filtering parameters associated with trips, each one of the trips being associated with (3) a driver departure position, (4) a driver arrival position, (5) an original route from the driver departure position to the driver arrival position and (6) a deviation threshold reflective of an acceptable deviation from the original route, each one of the trip filtering parameters having been generated based on at least one of (3) the driver departure position, (4) the driver arrival position, (5) the original route and (6) the deviation threshold;
determining, by the processor, that at least one of the trips is a candidate for which a detour route is to be computed based on an analysis of (A) the rideshare request parameter and (B) a corresponding trip filtering parameter associated with the at least one of the trips;
causing to compute, for the at least one of the trips determined as being the candidate for which the detour route is to be computed, a detoured trip, the detoured trip being associated with (7) a detour route and (8) a deviation value associated with the detour route and reflective of a deviation between the original route and the detour route;
determining, by the processor, that the detoured trip is to be presented to the potential passenger by analysing the (8) deviation value of the detoured trip and the (6) deviation threshold; and
transmitting, to the electronic device, data associated with the detoured trip for displaying to the potential passenger.

[Clause 2] The method of clause 1, wherein determining that the at least one of the trips is the candidate for which the detour route is to be computed is executed prior to the detour route being computed.

[Clause 3] The method of any of clauses 1 and 2, wherein the corresponding trip filtering parameter allows determining whether the trip associated with the corresponding trip filtering parameter is a candidate for which a detour route is to be computed for a given rideshare request.

[Clause 4] The method of any of clauses 1 to 3, wherein causing to compute a detoured trip comprises:
transmitting, to a routing engine, at least one of the rideshare request, the search departure position, the search arrival position, the rideshare request parameter, the at least one of the trips, a corresponding original route associated with the at least one of the trips, a corresponding driver departure position associated with the at least one of the trips, a corresponding driver arrival position associated with the at least one of the trips and the corresponding trip filtering parameter;
causing the routing engine to generate the detoured trip by computing a detoured route based on the at least one of the rideshare request, the search departure position, the search arrival position, the rideshare request parameter, the at least one of the trips, the corresponding original route associated with the at least one of the trips, the corresponding driver departure position associated with the at least one of the trips, the corresponding driver arrival position associated with the at least one of the trips and the corresponding trip filtering parameter; and receiving, from the routing engine, the detoured trip.

[Clause 5] The method of any of clauses 1 to 4, wherein determining that the at least one of the trips is a candidate for which a detour route is to be computed based on the analysis of (A) the rideshare request parameter and (B) the corresponding trip filtering parameters associated with the at least one of the trips comprises one of (C) adding the at least one of the trips to a list of candidates for which a detour route is to be computed and (D) disregarding the at least one of the trips so that it is not added to the list of candidates.

[Clause 6] The method of any of clauses 1 to 5, wherein determining that the at least one of the trips is a candidate for which a detour route is to be computed based on an analysis of (A) the rideshare request parameter and (B) the corresponding trip filtering parameters associated with the at least one of the trips comprises applying an heuristic function allowing to determine if a first direction of a first route extending from (1) the search departure position to (2) the search arrival position is similar to a second direction of a second route extending from (3) a corresponding driver departure position associated with the at least one of the trips to (4) a corresponding driver arrival position associated with the at least one of the trips.

[Clause 7] The method of any of clauses 1 to 6, wherein generating the rideshare request parameter comprises determining, by the processor, a search angular direction based on the search departure position and the search arrival position.

[Clause 8] The method of clause 7, wherein determining the search angular direction is further based on an angular direction parameter defining an acceptable angular direction range, the acceptable angular direction range comprising a lower bound defined as (search angular direction−angular direction parameter) and an upper bound defined as (search angular direction+angular direction parameter).

[Clause 9] The method of clause 8, wherein the corresponding trip filtering parameters associated with the at least one of the trips comprises a trip angular direction determined based on a corresponding driver departure position and a corresponding driver arrival position.

[Clause 10] The method of clause 9, wherein the analysis of (A) the rideshare request parameter and (B) the corresponding trip filtering parameter associated with the at least one of the trips comprises comparing the trip angular direction with the search angular direction.

[Clause 11] The method of any of clauses 1 to 10, wherein generating the rideshare request parameter comprises causing to compute a search realistic distance between the search departure position and the search arrival position.

[Clause 12] The method of clause 11, wherein the corresponding trip filtering parameter associated with the at least one of the trips comprises the driver departure position and the driver arrival position.

[Clause 13] The method of clause 12, wherein the analysis of (A) the rideshare request parameter and (B) the corresponding trip filtering parameter associated with the at least one of the trips comprises:

determining, by the processor, a first shortest distance between the search departure position and the driver departure position; and determining, by the processor, a second shortest distance between the search arrival position and the driver arrival position.

[Clause 14] The method of clause 13, wherein the corresponding trip filtering parameter comprises a deviation threshold, the deviation threshold being associated with at least one of an absolute deviation distance, a relative deviation distance, an absolute deviation duration and a relative deviation duration.

[Clause 15] The method of clause 14, wherein the analysis of (A) the rideshare request parameter and (B) the corresponding trip filtering parameter associated with the at least one of the trips comprises comparing the deviation threshold with the search realistic distance, the first shortest distance and the second shortest distance.

[Clause 16] The method of clause 15, wherein upon determining that the deviation threshold is no more than a value based on the following equation:

the first shortest distance+the search realistic distance+the second shortest distance−a driver realistic distance,then determine that the at least one trip is a candidate for which a detour route is to be computed, the driver realistic distance being determined based on the driver departure position and the driver arrival position.

[Clause 17] The method of clause 15, wherein the corresponding trip filtering parameter associated with the at least one of the trips comprises a driver realistic distance between the driver departure position and the driver arrival position.

[Clause 18] The method of clause 17, the analysis of (A) the rideshare request parameter and (B) the corresponding trip filtering parameter associated with the at least one of the trips comprises comparing the search realistic distance with the driver realistic distance.

[Clause 19] The method of clause 18, the deviation threshold comprises at least one of a maximal detour duration, a maximal detour distance, a minimal duration with a passenger and a minimal distance with a passenger.

[Clause 20] The method of clause 19, wherein, upon determining that one of (E) a value of a difference between the driver realistic distance and the search realistic distance is less than an absolute value associated with the deviation threshold and (F) a ratio between the driver realistic distance and the search realistic distance is less than a relative value associated with the corresponding deviation threshold:

determine that the at least one of the trips is a candidate for which a detour route is to be computed.

[Clause 21] The method of any of clauses 1 to 20, wherein the deviation value is at least one of an absolute detour duration, an absolute detour distance, a relative detour duration and a relative detour distance.

[Clause 22] The method of any of clauses 1 to 21, wherein, further to determining that the detoured trip is to be presented to the potential passenger, the method comprises, adding the detoured trip to a list of detoured trips.

[Clause 23] The method of clause 22, wherein the method further comprises sorting, by the processor, the list of detoured trips based on deviation values associated with each one of the detoured trips of the list of detoured trips.

[Clause 24] The method of clause 23, wherein transmitting the detoured trip for displaying to the potential passenger comprises transmitting the list of detoured trips.

[Clause 25] The method of any of clauses 1 to 24, wherein the detour route is based on the original route.

[Clause 26] The method of any of clauses 1 to 25, wherein the detoured trip is further based on meeting points determined as an acceptable compromise between one of the search departure position and the search arrival position and a waypoint of the detoured route.

[Clause 27] The method of any of clauses 1 to 26, wherein causing to compute the detoured trip is further based on an analysis of similarities between the original route and the detour route.

[Clause 28] A computer-implemented method for execution by a system, the method comprising:

receiving, from an electronic device associated with a potential passenger, a rideshare request, the rideshare request being associated with (1) a search departure position and (2) a search arrival position;

accessing, from a database, (B) trip filtering parameters associated with trips, each one of the trips being associated with (3) a driver departure position, and (4) a driver arrival position, each one of the trip filtering parameters having been generated based on at least one of the (3) driver departure position and (4) the driver arrival position;

determining, by the processor, for at least one the trips, that the at least one trip is a candidate for which a detour route is to be computed based on an analysis of (1) the searched departure position and (2) the searched arrival position and (B) the trip filtering parameters;

causing to compute, for the at least one trip determined as being a candidate for which a detour route is to be computed, a detoured trip; and storing, in a non-transitory computer readable medium, the detoured trip.

[Clause 29] A computer-implemented method for execution by a system, the method comprising:

receiving, from an electronic device, a rideshare request associated with a potential passenger, the rideshare request being associated with (1) a search departure position and (2) a search arrival position;

accessing, from a database, parameters associated with trips, the parameters being associated with (3) a driver departure position, (4) a driver arrival position and (6) a deviation threshold reflective of an acceptable deviation from an original route between the driver departure position and the driver arrival position;

identifying, by a processor, a set of trip candidates for which a detour route is to be computed based on an analysis of the rideshare request and the parameters associated with the trips;

causing to compute, for at least one trip candidate of the set of trip candidates, a detoured trip associated with (7) a detour route and (8) a deviation value associated with the detour route and reflective of a deviation between the original route and the detour route;

generating, by the processor, a list of detoured trips based on a determination that, for the at least one of the candidate, the computed deviation value does not exceed the deviation threshold associated with a corresponding trip; and storing, in a non-transitory computer readable medium, the list of detoured trips.

[Clause 30] A computer-implemented method for execution by a system, the method comprising:

receiving, from an electronic device associated with a driver, instructions to create a trip in a ridesharing platform, the instructions being associated with (1) a driver departure position, (2) a driver arrival position and (3) a deviation threshold reflective of an acceptable deviation from an original route from the driver departure position to the driver arrival position;

generating, by a processor, trip data, the trip data being associated with (1) the driver departure position and (2) the driver arrival position;

generating, by the processor, trip filtering parameters allowing determining whether the trip data is a candidate for which a detour route is to be computed upon receiving a rideshare request, the rideshare request comprising (4) a search departure position and (5) a search arrival position, the trip filtering parameters being generated based on at least one of the (1) driver departure position, (2) the driver arrival position and (3) the deviation threshold;

storing, in a first database, the trip data;

storing, in a second database, the trip filtering parameters; and transmitting, to the electronic device, a confirmation that the ridesharing platform has been updated so that the trip data may be taken into consideration for determining whether the trip data is a candidate for which a detour route is to be computed in response to the receipt of the rideshare request.

[Clause 31] The method of clause 30, wherein, allowing determining whether the trip is a candidate for which a detour route is to be computed does not require the detour route to be computed.

[Clause 32] The method of any of clauses 30 and 31, wherein the first database and the second database are a same database.

[Clause 33] The method of any of clauses 30 to 32, wherein generating trip filtering parameters comprises computing an angular direction based on the driver departure position and the driver arrival position.

[Clause 34] The method of any of clauses 30 to 33, wherein the deviation threshold is associated with at least one of an absolute deviation distance and a relative deviation distance.

[Clause 35] The method of any of clauses 30 to 34, wherein generating the trip filtering parameters comprises computing a driver realistic distance between the driver departure position and the driver arrival position.

[Clause 36] The method of any of clauses 30 to 35, wherein the deviation threshold comprises at least one of a maximal detour duration, a maximal detour distance, a minimal duration with a passenger and a minimal distance with a passenger.

[Clause 37] A computer-implemented system configured to perform the method of any one of clauses 1 to 36.

[Clause 38] A non-transitory computer-readable medium comprising computer-executable instructions that cause a system to execute the method according to any one of clauses 1 to 36.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for execution by a system, the method comprising:

receiving, from an electronic device associated with a potential passenger, a rideshare request, the rideshare request being associated with a search departure position and a search arrival position;

generating, by a processor, a rideshare request parameter based on at least one of the search departure position and the search arrival position, wherein the generating comprises determining a search compass bearing based on the search departure position and the search arrival position;

accessing, from a database, trip filtering parameters associated with trips, each one of the trips being associated with a driver departure position, a driver arrival position, an original route from the driver departure position to the driver arrival position and a deviation threshold reflective of an acceptable deviation from the original route, each one of the trip filtering parameters having been generated based on at least one of the driver departure position, the driver arrival position, the original route and the deviation threshold;

determining, by the processor, that at least one of the trips is a candidate for which a detour route is to be computed based on an analysis of the rideshare request parameter and a corresponding trip filtering parameter associated with the at least one of the trips, wherein the corresponding trip filtering parameter comprises a trip compass bearing determined based on a corresponding driver departure position and a corresponding driver arrival position, and wherein the analysis comprises comparing the trip compass bearing with the search compass bearing;

causing to compute, for the at least one of the trips determined as being the candidate for which the detour route is to be computed, a detoured trip, the detoured trip being associated with a detour route and a deviation value, wherein the deviation value is associated with the detour route and reflective of a deviation between the original route and the detour route;

determining, by the processor, that the detoured trip is to be presented to the potential passenger by analysing the deviation value of the detoured trip and the deviation threshold associated with the at least one of the trips; and transmitting, to the electronic device, data associated with the detoured trip for displaying to the potential passenger.

2. The method of claim 1, wherein prior to the detour route being computed, the at least one of the trips is determined as the candidate for which the detour route is to be computed.

3. The method of claim 1, wherein the corresponding trip filtering parameter allows determining whether the trip associated with the corresponding trip filtering parameter is a candidate for which a detour route is to be computed for a given rideshare request.

4. The method of claim 1, wherein causing to compute a detoured trip comprises:

transmitting, to a routing engine, at least one of the rideshare request, the search departure position, the search arrival position, the rideshare request parameter, the at least one of the trips, a corresponding original route associated with the at least one of the trips, a corresponding driver departure position associated with the at least one of the trips, a corresponding driver arrival position associated with the at least one of the trips and the corresponding trip filtering parameter;

causing the routing engine to generate the detoured trip by computing a detoured route based on the at least one of the rideshare request, the search departure position, the search arrival position, the rideshare request parameter, the at least one of the trips, the corresponding original route associated with the at least one of the trips, the corresponding driver departure position associated with the at least one of the trips, the corresponding driver arrival position associated with the at least one of the trips and the corresponding trip filtering parameter; and receiving, from the routing engine, the detoured trip.

5. The method of claim 1, wherein determining that the at least one of the trips is a candidate for which a detour route is to be computed based on the analysis of the rideshare request parameter and the corresponding trip filtering parameter associated with the at least one of the trips comprises one of adding the at least one of the trips to a list of candidates for which a detour route is to be computed and disregarding the at least one of the trips so that it is not added to the list of candidates.

6. The method of claim 1, wherein determining that the at least one of the trips is a candidate for which a detour route is to be computed based on an analysis of the rideshare request parameter and the corresponding trip filtering parameters associated with the at least one of the trips comprises applying an heuristic function to determine if a first direction of a first route extending from the search departure position to the search arrival position is similar to a second direction of a second route extending from a corresponding driver departure position associated with the at least one of the trips to a corresponding driver arrival position associated with the at least one of the trips.

7. The method of claim 1, wherein determining the search compass bearing is further based on an angular direction parameter defining an acceptable angular direction range, the acceptable angular direction range comprising a lower bound defined as (search compass bearing−angular direction parameter) and an upper bound defined as (search compass bearing+angular direction parameter).

8. The method of claim 1, wherein generating the rideshare request parameter comprises causing to compute a search realistic distance between the search departure position and the search arrival position.

9. The method of claim 8, wherein the corresponding trip filtering parameter associated with the at least one of the trips comprises the driver departure position and the driver arrival position.

10. The method of claim 9, wherein the analysis of the rideshare request parameter and the corresponding trip filtering parameter associated with the at least one of the trips comprises:

determining, by the processor, a first shortest distance between the search departure position and the driver departure position; and determining, by the processor, a second shortest distance between the search arrival position and the driver arrival position.

11. The method of claim 10, wherein the corresponding trip filtering parameter comprises the deviation threshold associated with the at least one of the trips, the deviation threshold being associated with at least one of an absolute deviation distance, a relative deviation distance, an absolute deviation duration and a relative deviation duration.

12. The method of claim 11, wherein the analysis of the rideshare request parameter and the corresponding trip filtering parameter associated with the at least one of the trips comprises comparing the deviation threshold with the search realistic distance, the first shortest distance and the second shortest distance.

13. The method of claim 12, wherein upon determining that the deviation threshold is no more than a value based on the following equation:

the first shortest distance+the search realistic distance+the second shortest distance−a driver realistic distance, then determine that the at least one trip is a candidate for which a detour route is to be computed, the driver realistic distance being determined based on the driver departure position and the driver arrival position.

14. The method of claim 12, wherein the corresponding trip filtering parameter associated with the at least one of the trips comprises a driver realistic distance between the driver departure position and the driver arrival position.

15. The method of claim 14, wherein the analysis of the rideshare request parameter and the corresponding trip filtering parameter associated with the at least one of the trips comprises comparing the search realistic distance with the driver realistic distance.

16. The method of claim 15, wherein the deviation threshold comprises at least one of a maximal detour duration, a maximal detour distance, a minimal duration with a passenger and a minimal distance with a passenger.

17. The method of claim 16, wherein, upon determining that one of a value of a difference between the driver realistic distance and the search realistic distance is less than an absolute value associated with the deviation threshold and a ratio between the driver realistic distance and the search realistic distance is less than a relative value associated with the corresponding deviation threshold:

determine that the at least one of the trips is a candidate for which a detour route is to be computed.

18. The method of claim 1, wherein the deviation value is at least one of an absolute detour duration, an absolute detour distance, a relative detour duration and a relative detour distance.

19. The method of claim 1, wherein, further to determining that the detoured trip is to be presented to the potential passenger, the method comprises, adding the detoured trip to a list of detoured trips.

20. The method of claim 19, wherein the method further comprises sorting, by the processor, the list of detoured trips based on deviation values associated with each one of the detoured trips of the list of detoured trips.

21. The method of claim 20, wherein transmitting the detoured trip for displaying to the potential passenger comprises transmitting the list of detoured trips.

22. The method of claim 1, wherein the detour route is based on the original route.

23. The method of claim 1, wherein the detoured trip is further based on meeting points determined as an acceptable compromise between one of the search departure position and the search arrival position and a waypoint of the detoured route.

24. The method of claim 1, wherein causing to compute the detoured trip is further based on an analysis of similarities between the original route and the detour route.

25. The method of claim 1, wherein the trip compass bearing is determined based on a line segment extending from the corresponding driver departure position to the corresponding driver arrival position.

26. The method of claim 25, wherein the trip compass bearing comprises an angle between the line segment and a reference line crossing the corresponding driver departure position.

27. The method of claim 25, wherein the search compass bearing is generated according to a computation method similar to a computation method used to generate the trip compass bearing.

28. A computer-implemented method for execution by a system, the method comprising:
receiving, from an electronic device associated with a driver, instructions to create a trip in a ridesharing platform, the instructions being associated with a driver departure position, a driver arrival position and a deviation threshold reflective of an acceptable deviation from an original route from the driver departure position to the driver arrival position;
generating, by a processor, trip data, the trip data being associated with the driver departure position and the driver arrival position;
generating, by the processor, trip filtering parameters allowing determining whether the trip data is a candidate for which a detour route is to be computed upon receiving a rideshare request, the rideshare request comprising a search departure position and a search arrival position, the trip filtering parameters being generated based on at least one of the driver departure position, the driver arrival position and the deviation threshold, wherein the trip filtering parameters comprise a trip compass bearing determined based on the driver departure position and the driver arrival position;
storing, in a first database, the trip data;
storing, in a second database, the trip filtering parameters; and
transmitting, to the electronic device, a confirmation that the ridesharing platform has been updated so that the trip data may be taken into consideration for determining whether the trip data is a candidate for which a detour route is to be computed in response to the receipt of the rideshare request.

29. A system, the system comprising:
a processor;
a non-transitory computer-readable medium, the non-transitory computer-readable medium comprising control logic which, upon execution by the processor, causes:
receiving, from an electronic device associated with a potential passenger, a rideshare request, the rideshare request being associated with a search departure position and a search arrival position;
generating, by the processor, a rideshare request parameter based on at least one of the search departure position and the search arrival position, wherein the generating comprises determining a search compass bearing based on the search departure position and the search arrival position;
accessing, from a database, trip filtering parameters associated with trips, each one of the trips being associated with a driver departure position, a driver arrival position, an original route from the driver departure position to the driver arrival position and a deviation threshold reflective of an acceptable deviation from the original route, each one of the trip filtering parameters having been generated based on at least one of the driver departure position, the driver arrival position, the original route and the deviation threshold;

determining, by the processor, that at least one of the trips is a candidate for which a detour route is to be computed based on an analysis of the rideshare request parameter and a corresponding trip filtering parameter associated with the at least one of the trips, wherein the corresponding trip filtering parameter comprises a trip compass bearing determined based on a corresponding driver departure position and a corresponding driver arrival position, and wherein the analysis comprises comparing the trip compass bearing with the search compass bearing;

causing to compute, for the at least one of the trips determined as being the candidate for which the detour route is to be computed, a detoured trip, the detoured trip being associated with a detour route and a deviation value, wherein the deviation value is associated with the detour route and reflective of a deviation between the original route and the detour route;

determining, by the processor, that the detoured trip is to be presented to the potential passenger by analysing the deviation value of the detoured trip and the deviation threshold associated with the at least one of the trips; and transmitting, to the electronic device, data associated with the detoured trip for displaying to the potential passenger.

30. A system, the system comprising:

a processor;

a non-transitory computer-readable medium, the non-transitory computer-readable medium comprising control logic which, upon execution by the processor, causes:

receiving, from an electronic device associated with a driver, instructions to create a trip in a ridesharing platform, the instructions being associated with a driver departure position, a driver arrival position and a deviation threshold reflective of an acceptable deviation from an original route from the driver departure position to the driver arrival position;

generating, by the processor, trip data, the trip data being associated with the driver departure position and the driver arrival position;

generating, by the processor, trip filtering parameters allowing determining whether the trip data is a candidate for which a detour route is to be computed upon receiving a rideshare request, the rideshare request comprising a search departure position and a search arrival position, the trip filtering parameters being generated based on at least one of the driver departure position, the driver arrival position and the deviation threshold, wherein the trip filtering parameters comprise a trip compass bearing determined based on the driver departure position and the driver arrival position;

storing, in a first database, the trip data;

storing, in a second database, the trip filtering parameters; and transmitting, to the electronic device, a confirmation that the ridesharing platform has been updated so that the trip data may be taken into consideration for determining whether the trip data is a candidate for which a detour route is to be computed in response to the receipt of the rideshare request.

* * * * *